United States Patent
Kobayashi et al.

(10) Patent No.: US 9,674,717 B2
(45) Date of Patent: Jun. 6, 2017

(54) RADIO PARAMETER CONTROL SYSTEM, RADIO PARAMETER CONTROL APPARATUS, RADIO BASE STATION, RADIO PARAMETER CONTROL METHOD AND PROGRAM

(71) Applicants: Kosei Kobayashi, Tokyo (JP); Hiroto Sugahara, Tokyo (JP)

(72) Inventors: Kosei Kobayashi, Tokyo (JP); Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 14/365,046

(22) PCT Filed: Dec. 10, 2012

(86) PCT No.: PCT/JP2012/081923
§ 371 (c)(1),
(2) Date: Jun. 12, 2014

(87) PCT Pub. No.: WO2013/089058
PCT Pub. Date: Jun. 20, 2013

(65) Prior Publication Data
US 2014/0315539 A1 Oct. 23, 2014

(30) Foreign Application Priority Data
Dec. 13, 2011 (JP) .................. 2011-271828

(51) Int. Cl.
*H04W 24/02* (2009.01)
*H04W 16/18* (2009.01)

(52) U.S. Cl.
CPC .......... *H04W 24/02* (2013.01); *H04W 16/18* (2013.01)

(58) Field of Classification Search
CPC .................................................. H04W 24/02
See application file for complete search history.

(56) References Cited

U.S. PATENT DOCUMENTS 5,999,816 A * 12/1999 Tiedemann, Jr. . H04W 36/0066
455/436
2004/0202131 A1* 10/2004 An .................. H04W 36/18
370/331
(Continued)

FOREIGN PATENT DOCUMENTS

| JP | 2011-044808 A | 3/2011 |
|----|---|---|
| WO | WO 00/72618 A1 | 11/2000 |
| WO | WO 2004/082154 A2 | 9/2004 |

OTHER PUBLICATIONS

Counterpart Extended European Search Report dated Jun. 29, 2015in corresponding European Application No. 12857687.3.
(Continued)

*Primary Examiner* — Mazda Sabouri
(74) *Attorney, Agent, or Firm* — McGinn IP Law Group, PLLC

(57) ABSTRACT

An apparatus for controlling a radio parameter of radio cells, includes: an evaluation targeted radio cell selection unit configured to decide evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and select at least one of the evaluation targeted candidate radio cells as an evaluation targeted radio cell for evaluating the radio parameter of the control targeted radio cell; and a radio parameter control unit configured to control the radio parameter of the control targeted radio cell based on quality of the evaluation targeted radio cell.

17 Claims, 15 Drawing Sheets

(56) References Cited

U.S. PATENT DOCUMENTS

| | | | | |
|---|---|---|---|---|
| 2007/0142051 A1* | 6/2007 | Xu | ........................ | H04W 36/12 |
| | | | | 455/436 |
| 2011/0098042 A1* | 4/2011 | Mach | .................... | H04W 48/20 |
| | | | | 455/435.1 |
| 2011/0142008 A1* | 6/2011 | Choi | ..................... | H04W 36/04 |
| | | | | 370/332 |

OTHER PUBLICATIONS

International Search Report (ISR) (PCT Form PCT/ISA/210), in PCT/JP2012/081923, dated Jan. 15, 2013.
"Vertical Antenna Tilt Optimization for LTE Base Stations" Alcatel-Lucent Bell Labs, Vehicular Technology Conference (VTC Spring), 2011.

* cited by examiner

RADIO PARAMETER CONTROL SYSTEM, RADIO PARAMETER CONTROL APPARATUS, RADIO BASE STATION, RADIO PARAMETER CONTROL METHOD AND PROGRAM

TECHNICAL FIELD

The present invention relates to a radio parameter control system, a radio parameter control apparatus, a radio base station, a radio parameter control method and program.

BACKGROUND ART

In a cellular radio communication network represented by a mobile phone, a wide service area is formed by distributing and arranging a plurality of radio base stations. Each radio station forms a radio cell, which is an area within which communication with each radio station is possible. Usually, about one to six radio cell(s) are managed by one radio base station. In addition, it is possible to continue communication by handover by which adjacent radio cells have an overlap in a part of coverage, even when a radio terminal (User Equipment: UE) moves over the radio cells.

At the time of installing or operating radio base stations, the coverage of a radio cell is optimized so as to reduce the areas in which communication is not possible, and further improve communication quality of UE, in particular, throughput. In general, a drive test using dedicated measurement instruments is performed in the field. In the drive test, received power or interference condition of radio wave, an abnormal communication cut-off or a handover failure, and throughput are measured. Then, an insufficient area of received power (Weak coverage), or an area where strong interference is received (Pilot pollution) is specified to adjust a radio parameter for solving such problems. The radio parameter to be adjusted is, for example, an antenna tilt angle of a radio cell, an antenna azimuth angle, transmitted power and a handover parameter.

The coverage optimization for a radio cell based on the above-described drive test causes an increase of operating costs for the radio communication network due to manual measurement or manual tuning operation of a radio parameter. For this reason, there has been proposed a technique for optimizing the coverage of a radio cell autonomously, so as to reduce costs for optimizing the coverage of the radio cell.

As a technique for optimizing the coverage of a radio cell autonomously, there is CCO (Coverage and Capacity Optimization) in a SON (Self Organizing Network). The SON is a technique for performing parameter settings or optimization for the radio communication network autonomously, and has been standardized in 3GPP (3rd Generation Partnership Project) as a technique for reducing CAPEX (Captital Expenditure) or OPEX (Operational Expenditure) for radio communication infrastructures. The CON is one of usage modes of the SON, and a technique for optimizing the coverage of a radio cell autonomously by collecting the measurement results of radio quality (e.g. RSRP: Reference Signal Received Power, and RSRQ: Reference Signal Received Quality) from the radio terminal and, changing the radio parameter (e.g. transmitted power or tilt angle of antenna) of the radio cell.

In addition, as other technique, there is ICIC (Inter-Cell Interference Coordination). The ICIC is a technique for avoiding interference by reducing transmitted power or stopping signal transmission in coordination with between the radio base stations based on radio quality information reported from a radio terminal.

By the way, it is necessary to evaluate the network quality and decide the necessity for changing a radio parameter in each radio cell, so as to optimize the radio parameter of the radio cells autonomously. Further, when actually changing the radio parameter, it is necessary to evaluate whether or not unexpected quality deterioration occurs due to the change.

As an example of the method for evaluating a radio parameter of the radio cells, there is a technique in Non-Patent Literature 1. According to the technique in Non-Patent Literature 1, the overall quality index that coordinates a plurality of radio cells is generated, and the effect for changing a tilt angle is evaluated using the index. For example, in the environment of 19 base stations and 57 cells, the overall quality index (U) is generated by the following formula, and a tilt angle in each radio cell is changed to maximize the value. Here, in the following formula, P is a set of radio cells and |P| represents 57, which is a total number of the radio cells. $S_{m,avg}$ represents average throughput of the radio cell m, and $S_{m,edge}$ represents cell edge throughput of the radio cell m. Further, $W_{avg}$ and $W_{edge}$ are the parameters for defining which of the average throughput and the cell edge throughput is more important.

$$U = \frac{1}{|P|} \sum_{m \in P} (w_{avg} S_{m,avg} + w_{edge} S_{m,edge})$$

CITATION LIST

Non-Patent Literature

[Non Patent Literature 1]
"Vertical Antenna Tilt Optimization for LTE Base Stations", Alcatel-Lucent Bell Labs, Vehicular Technology Conference (VTC Spring), 2011.

SUMMARY OF INVENTION

Technical Problem

However, to the radio cell (control targeted radio cell) for controlling a radio parameter, when unnecessarily setting many radio cells (evaluation targeted radio cells) for evaluating the radio parameter of the control targeted radio cell, the radio cells which are not directly related to a change of the radio parameter of the control targeted radio cell are taken into account, so that the radio parameter is not properly controlled. For example, where the control targeted radio cell and all of the radio cells (surrounding radio cells) within a given distance from the control targeted radio cell are set to the evaluation targeted radio cells, and where the radio parameter of the control targeted radio cell is changed taking quality deterioration of the evaluation targeted radio cells as a trigger, the quality deterioration which cannot be solved even by changing the radio parameter of the control targeted radio cell is also detected when taking the evaluation targeted radio cells too widely, thereby possibly causing an occurrence of unnecessary changing operation of the radio parameter. Further, as other example, where quality deterioration of the evaluation targeted radio cells is detected to perform fallback control (referring to control for setting back the radio parameter of the control targeted radio cell to an original state) after a change of the radio parameter of the control targeted radio cell, the quality deterioration not caused by changing the radio parameter is also detected when taking the evaluation targeted radio cells too widely, thereby possibly causing an occurrence of unnecessary fallback control.

Therefore, the present invention is made in view of the foregoing problems, and the purpose thereof is to provide a radio parameter control system, a radio parameter control apparatus, a radio base station, a radio parameter control method and program, which are capable of setting evaluation targeted radio cells properly upon control of a radio parameter of radio cells.

Solution to Problem

The present invention is a radio parameter control system for controlling a radio parameter of radio cells, the radio parameter control system comprising: evaluation targeted radio cell selection means configured to decide evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and select at least one of the evaluation targeted candidate radio cells as an evaluation targeted radio cell for evaluating the radio parameter of the control targeted radio cell; and radio parameter control means configured to control the radio parameter of the control targeted radio cell based on quality of the evaluation targeted radio cell.

The present invention is a radio parameter control apparatus for controlling a radio parameter of radio cells, the radio parameter control apparatus comprising: evaluation targeted radio cell selection means configured to decide evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and select at least one of the evaluation targeted candidate radio cells as an evaluation targeted radio cell for evaluating the radio parameter of the control targeted radio cell; and radio parameter control means configured to control the radio parameter of the control targeted radio cell based on quality of the evaluation targeted radio cell.

The present invention is a radio base station for controlling a radio parameter of radio cells, the radio base station comprising: evaluation targeted radio cell selection means configured to decide evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and select at least one of the evaluation targeted candidate radio cells as an evaluation targeted radio cell for evaluating the radio parameter of the control targeted radio cell; and radio parameter control means configured to control the radio parameter of the control targeted radio cell based on quality of the evaluation targeted radio cell.

The present invention is a radio parameter control method for controlling a radio parameter of radio cells, the method comprising: deciding evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and selecting at least one of the evaluation targeted candidate radio cells as an evaluation targeted radio cell for evaluating the radio parameter of the control targeted radio cell; and controlling the radio parameter of the control targeted radio cell based on quality of the evaluation targeted radio cell.

The present invention is a program for controlling a radio parameter of radio cells, the program causes a computer to realize: deciding evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and selecting at least one of the evaluation targeted candidate radio cells as an evaluation targeted radio cell for evaluating the radio parameter of the control targeted radio cell; and controlling the radio parameter of the control targeted radio cell based on quality of the evaluation targeted radio cell.

Advantageous Effect of Invention

According to the present invention, it is possible to set evaluation targeted radio cells properly upon control of a radio parameter of radio cells.

DESCRIPTION OF EMBODIMENTS

The outline of the present invention will be described.

Figure 1:
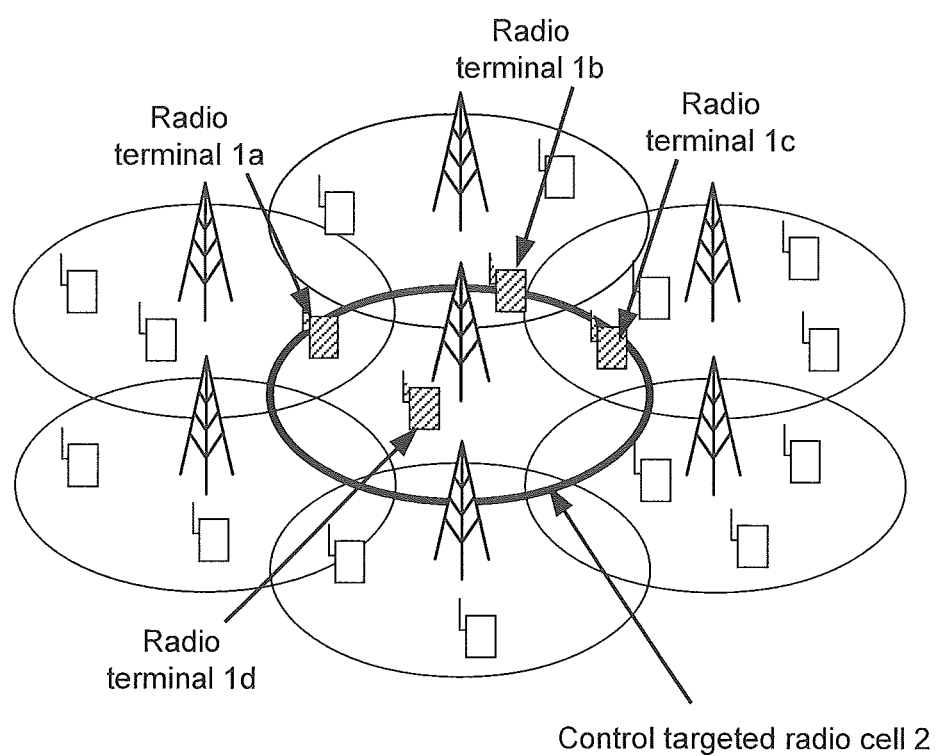
FIG. 1 is a diagram illustrating the outline of the present invention.
Figure 2:
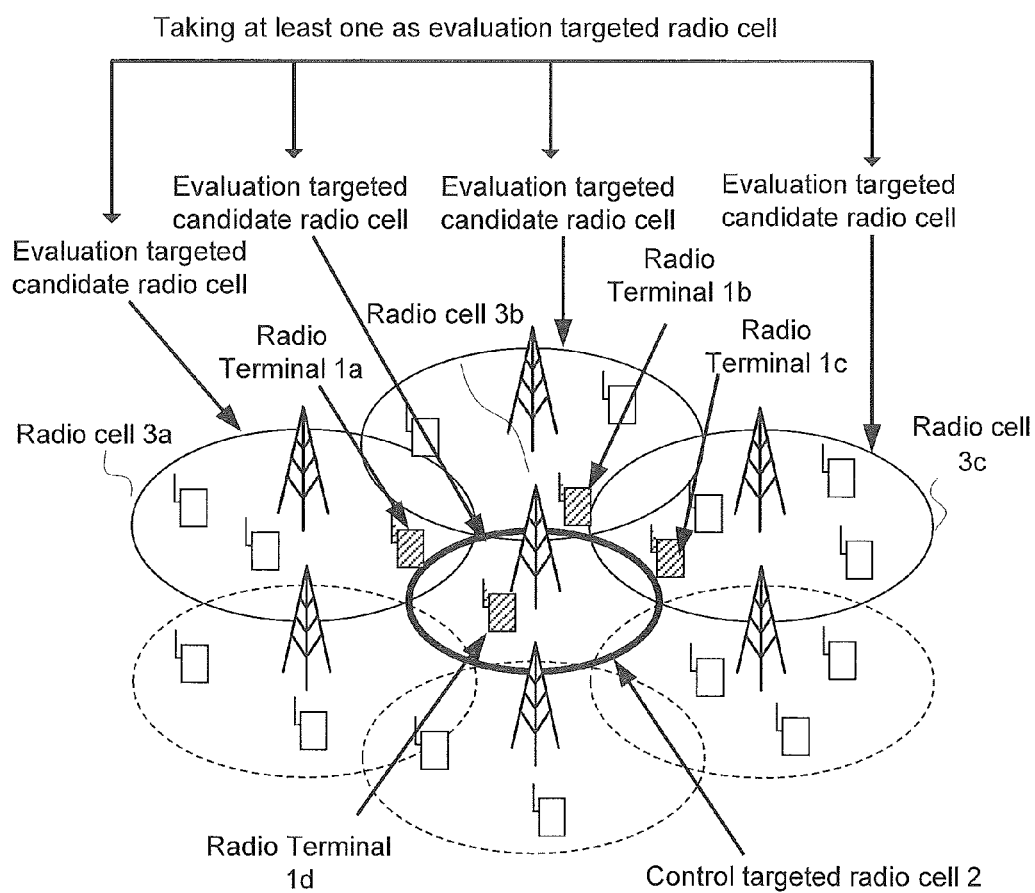
FIG. 2 is a diagram illustrating the outline of the present invention.

FIG. 1 and FIG. 2 are diagrams illustrating the outline of the present invention.

Usually, in a radio cell that a radio parameter is to be controlled (changed), for deciding whether or not quality deterioration which can be solved by changing a radio parameter of the own cell, or in a radio cell of which a radio parameter is controlled (changed), for deciding whether or not the radio parameter is properly controlled, the own cell or the radio cells around the own cell are set as an evaluation targeted radio cell to evaluate quality of the evaluation targeted radio cells. Note that, in the following descriptions, a radio cell of which a radio parameter is to be controlled (changed), or a radio cell of which a radio parameter is controlled (changed) is referred to as a control targeted radio cell.

However, as described above, when taking the evaluation targeted radio cells too widely, the radio cells which are not directly related to a change of the radio parameter of the control targeted radio cell are taken into account, so that the radio parameter is not properly controlled.

Therefore, according to the present invention, the evaluation targeted candidate radio cells are decided based on a change of a connection target radio cell of a radio terminal, which takes a control targeted radio cell or the surrounding radio cells of the control targeted radio cell as a serving cell, associated with a change of a connection range of the control targeted radio cell by control of the radio parameter of the control targeted radio cell, and at least one of the evaluation targeted candidate radio cells is selected as an evaluation targeted radio cell for evaluating the radio parameter of the control targeted radio cell. Then, the radio parameter of the control targeted radio cell is controlled based on quality of the evaluation targeted radio cell.

As one of the methods for deciding the evaluation candidate targeted radio cells, of connection target radio cells either before or after a change of a connection range of the control targeted radio cell, the connection target radio cells of a radio terminal taking a control targeted radio cell as the connection target radio cell either before or after a change of a connection range of the control targeted radio cell, there is a method for taking at least one or more than one radio cell excluding the control targeted radio cell as the evaluation targeted candidate radio cell. Note that taking at least one or more than one radio cell excluding the control targeted radio cell as the evaluation candidate targeted radio cell does not mean to exclude the control targeted radio cell from the evaluation targeted candidate radio cells, but it means to include at least one or more than one radio cell excluding the control targeted radio cell as the evaluation targeted candidate radio cell, of the connection target radio cells either before or after a change of a radio parameter of the control targeted radio cell, so it is needless to say that the evaluation targeted candidate radio cell includes the control targeted radio cell.

The description is made more specifically. Firstly, the following two modes are conceivable, when a connection target radio cell of a radio terminal changes before or after a change of a connection range of a control targeted radio cell.

A. The case in which a destination of a radio terminal taking a control targeted radio cell as a serving cell is a surrounding radio cell other than the control targeted radio cell.

B. The case in which a destination of a radio terminal taking the surrounding radio cells of a control targeted radio cell as a serving cell is the control targeted radio cell.

In the case of A, a radio terminal takes a control targeted radio cell as a connection target radio cell before a change of a connection range of the control targeted radio cell, and a radio terminal takes radio cells other than the control targeted radio cell as a connection target radio cell after a change of a connection range of the control targeted radio cell. Accordingly, the connection target radio cells after a change of a connection range of the control targeted radio cell, that is, the connection target radio cells other than the control targeted radio cell are taken as evaluation targeted candidate radio cells.

Further, in the case of B, a radio terminal takes surrounding radio cells other than a control targeted radio cell as a connection target radio cell before a change of a connection range of the control targeted radio cell, and a radio terminal takes the control targeted radio cell as a connection target radio cell after a change of a connection range of the control targeted radio cell. Accordingly, the surrounding radio cells other than the control targeted radio cell, which were the connection target radio cells before a change of a connection range of the control targeted radio cell, are taken as evaluation targeted candidate radio cells.

Further, the paragraph of "a connection target radio cell of a radio terminal, which takes a control targeted radio cell or the surrounding radio cells of the control targeted radio cell as a serving cell, associated with a change of a connection range of the control targeted radio cell by control of the radio parameter of the control targeted radio cell" has mainly two meanings, as described below.

1. The case, assuming that a radio parameter is changed to a candidate value (including radio parameter value currently set in the control targeted radio cell) without actually changing a radio parameter of a control targeted radio cell, in which a connection target radio cell of a radio terminal associated with a change of a connection range of the control targeted radio cell is predicted, and the predicted connection target radio cell is meant.

2. The case in which a connection target radio cell of a radio terminal is actually changed after a change of a connection range of a control targeted radio cell by actually changing the radio parameter of the control targeted radio cell, and the actual connection target radio cell (serving cell) after a change of the radio parameter is meant.

Next, a combination of "A" and "1" will be described in detail with reference to FIG. 1 and FIG. 2.

In FIG. 1, assuming that a radio cell of which a radio parameter is to be controlled (changed) is referred to as a control targeted radio cell 2. Here, the radio terminals taking the control targeted radio cell 2 as a serving cell are the radio terminals 1a to 1d. Next, assuming that, for example, transmitted power is reduced as a radio parameter of the control targeted radio cell 2, as shown in FIG. 2, the coverage of the control targeted radio cell 2 is changed, and it is predicted that a connection range of the control targeted radio cell 2 is changed. With this, it is predicted that the connection target radio cell of the radio terminals 1a to 1c taking the control targeted radio cell 2 as a serving cell is also changed. In FIG. 2, it is predicted that a connection target radio cell of the radio terminal 1a taking the control targeted radio cell 2 as a serving cell is changed to the radio cell 3a, it is predicted that a connection target radio cell of the radio terminal 1b taking the control targeted radio cell 2 as a serving cell is changed to the radio cell 3b, it is predicted that a connection target radio cell of the radio terminal 1c taking the control targeted radio cell 2 as a serving cell is changed to the radio cell 3c, and it is predicted that a connection target radio cell of the radio terminal 1d taking the control targeted radio cell 2 as a serving cell is not changed.

The connection target radio cells of each radio terminal 1a to 1d when it is assumed that a radio parameter of the control targeted radio cell 2 is changed are predicted using measurement information on the radio terminals 1a to 1d (e.g. radio quality measured by the radio terminals 1a to 1d), which is collected before a change of the radio parameter of the control targeted radio cell 2.

In this way, the connection target radio cells of the radio terminals 1a to 1d are predicted without actually changing the radio parameter. Then, of the predicted connection target radio cells of the radio terminals 1a to 1d, the radio cells 3a to 3c of which a destination cell is not the control targeted radio cell 2 and which are the connection target radio cells of the radio terminals 1a to 1c are taken as the evaluation targeted candidate radio cells for the control targeted radio cell 2. At this time, it is needless to say that the evaluation targeted candidate radio cell includes the control targeted radio cell 2.

Next, a combination of "B" and "1" will be described in detail with reference to FIGS. 3 and 4.

Figure 3:
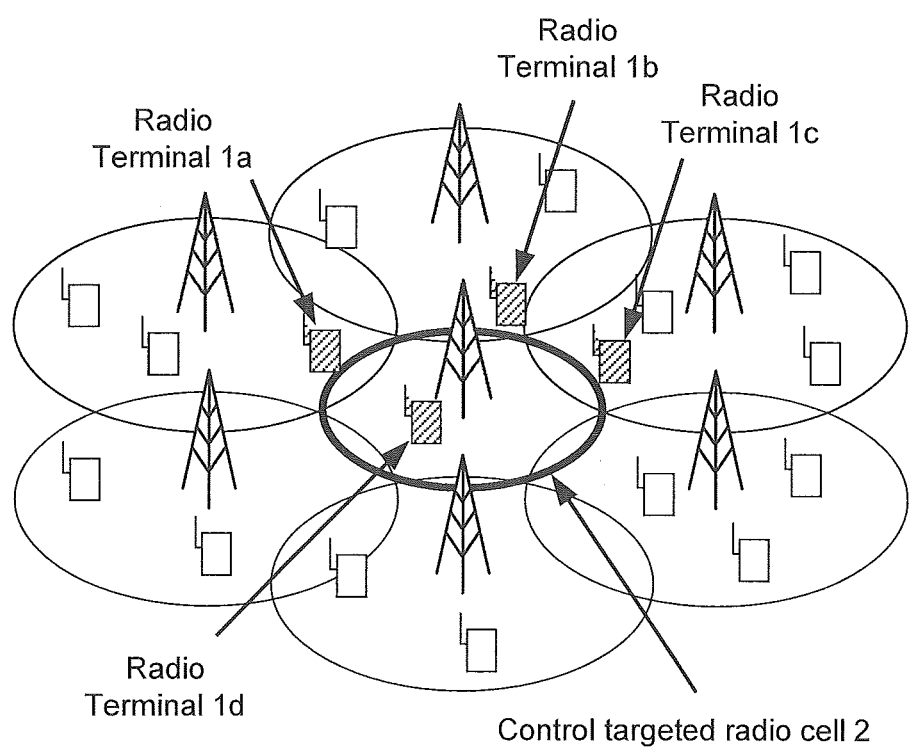
FIG. 3 is a diagram illustrating the outline of the present invention.
Figure 4:
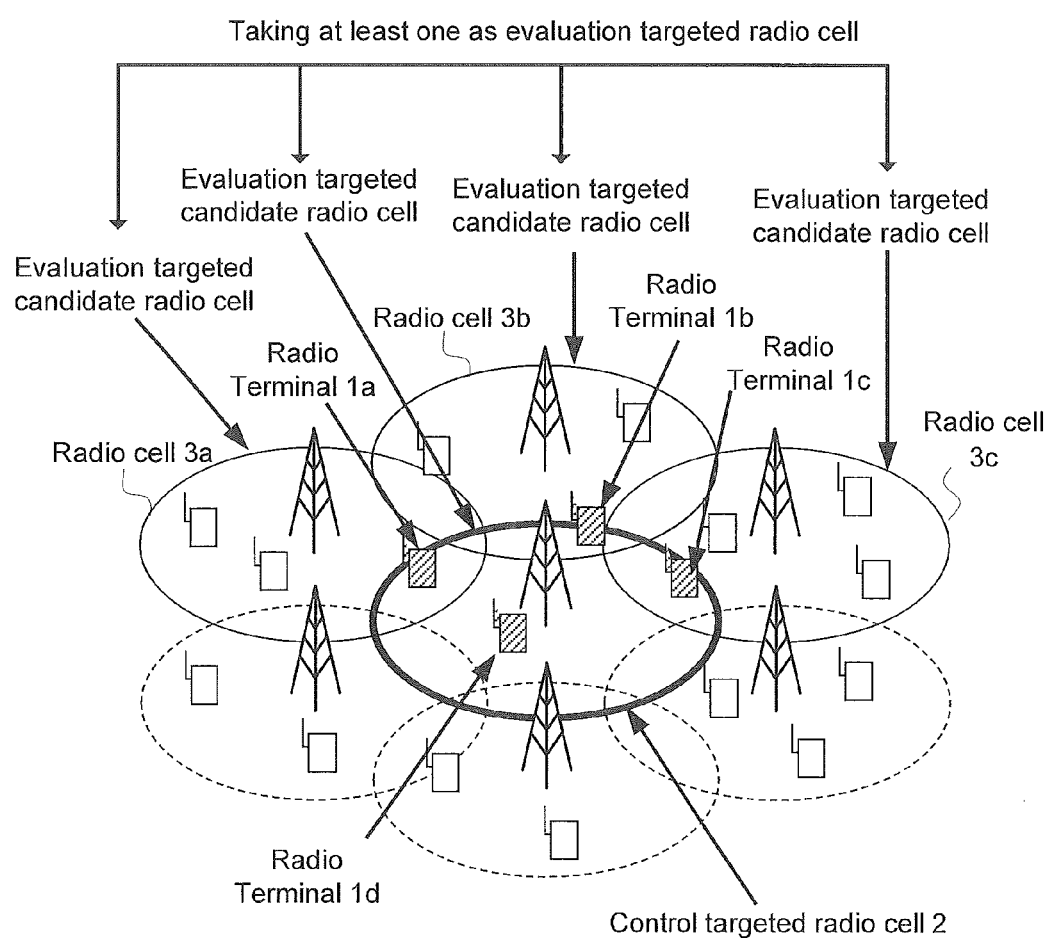
FIG. 4 is a diagram illustrating the outline of the present invention.

In FIG. 3, assuming that a radio cell of which a radio parameters is to be controlled (changed) is referred to as the control targeted radio cell 2. Here, the radio terminal taking the control targeted radio cell 2 as a serving cell is the radio terminals 1d. Next, assuming that, for example, transmitted power is increased as a radio parameter of the control targeted radio cell 2, as shown in FIG. 4, the coverage of the control targeted radio cell 2 is changed, and it is predicted that a connection range of the control targeted radio cell 2 is changed. With this, it is predicted that the connection target radio cells of the radio terminals 1a to 1 c taking the surrounding radio cells of the control targeted radio cell 2 as a serving cell are also changed. In FIG. 4, it is predicted that a connection target radio cell of the radio terminal 1a taking the radio cell 3a as a serving cell is changed to the control targeted radio cell 2, it is predicted that a connection target radio cell of the radio terminal 1b taking the radio cell 3b as a serving cell is changed to the control targeted radio cell 2, it is predicted that a connection target radio cell of the radio terminal 1c taking the radio cell 3c as a serving cell is changed to the control targeted radio cell 2, and it is predicted that a serving cell of the radio terminal 1d still remains in the control targeted radio cell 2.

The connection target radio cells of each radio terminal 1a to 1c when it is assumed that a radio parameter of the control targeted radio cell 2 is changed are predicted using measurement information on the radio terminals 1a to 1c (e.g. radio quality measured by the radio terminals 1a to 1c), which is collected before a change of the radio parameter of the control targeted radio cell 2. At this time, it is needless to say that the evaluation targeted candidate radio cell includes the control targeted radio cell 2.

In this way, the connection target radio cells of the radio terminals 1a to 1d are predicted without actually changing the radio parameter. Then, when the connection target radio cell of the predicted radio terminals 1a to 1c is the control targeted radio cell 2, the serving cells (radio cells 3a, 3b and 3c) of the radio terminals 1a to 1c are taken as the evaluation targeted candidate radio cells for the control targeted radio cell 2. At this time, it is needless to say that the evaluation targeted candidate radio cell includes the control targeted radio cell 2.

Next, a combination of "A" and "2" will be described in detail with reference to FIGS. 1 and 2.

FIG. 1 shows a state before a change of the radio parameter of the control targeted radio cell 2. Here, the radio terminals taking the control targeted radio cell 2 as a serving cell by the current settings of the radio parameter are the radio terminals 1a to 1d. Next, when, for example, transmitted power is reduced as the radio parameter of the control targeted radio cell 2, as shown in FIG. 2, the coverage of the control targeted radio cell 2 is changed, and a connection range of the control targeted radio cell 2 is changed. With this, the serving cells of the radio terminals 1a to 1c are also changed. In FIG. 2, the serving cell of the radio terminal 1a is changed from the control targeted radio cell 2 to the radio cell 3a, the serving cell of the radio terminal 1b is changed from the control targeted radio cell 2 to the radio cell 3b, the serving cell of the radio terminal 1c is changed from the control targeted radio cell 2 to the radio cell 3c, and the serving cell of the radio terminal 1d remains in the control targeted radio cell 2.

In this way, the serving cell of each radio terminal 1a to 1d, which has taken the control targeted radio cell 2 as a serving cell, after a change of the radio parameter of the control targeted radio cell 2 is obtained as an actual measurement value, not as a predicted value. For example, using a trace function for the radio terminals 1a to 1d on the core network side, the serving cell may be obtained by searching the serving cells of the radio terminals 1a to 1d after a change of the radio parameter, or the serving cell may be obtained by having the serving cell after a change of the radio parameter (e.g. an ID of radio cell detected by radio terminals 1a to 1d) reported from the radio terminals 1a to 1d, or the serving cell may be obtained by deciding which radio cell the radio terminals 1a to 1d move to, referring to handover information after a change of the radio parameter.

Of the serving cells of the radio terminals 1a to 1d after a change of radio parameters, which are obtained in this way, the serving cells (radio cells 3a, 3b and 3c) of the radio terminals 1a to 1c which are not the control targeted radio cell 2 are taken as the evaluation targeted candidate radio cells for the control targeted radio cell 2. At this time, it is needless to say that the evaluation targeted candidate radio cell includes the control targeted radio cell 2.

Next, a combination of "B" and "2" will be described in detail with reference to FIG. 3 and FIG. 4.

FIG. 3 shows a state before a change of the radio parameter of the control targeted radio cell 2. Here, the radio terminals taking the control targeted radio cell 2 as a serving cell by the current settings of the radio parameter are the radio terminals 1a to 1d. Next, when, for example, transmitted power is increased as the radio parameter of the control targeted radio cell 2, as shown in FIG. 4, the coverage of the control targeted radio cell 2 is changed, and a connection range of the control targeted radio cell 2 is changed. With this, the serving cells of the radio terminals 1a to 1 c connected to the surrounding radio cells of the control targeted radio cell are also changed. In FIG. 4, a connection target radio cell of the radio terminal 1a taking the radio cell 3a as a serving cell is changed to the control targeted radio cell 2, a connection target radio cell of the radio terminal 1b taking the radio cell 3b as a serving cell is changed to the control targeted radio cell 2, a connection target radio cell of the radio terminal 1c taking the radio cell 3c as a serving cell is changed to the control targeted radio cell 2, and a serving cell of the radio terminal 1d remains in the control targeted radio cell 2.

In this way, the serving cell of each radio terminal 1a to 1d, which has taken the surrounding radio cells of the control targeted radio cell 2 as a serving cell, after a change of the radio parameter of the control targeted radio cell 2 is obtained as an actual measurement value, not as a predicted value. For example, using a trace function for the radio terminals 1a to 1c on the core network side, the serving cell may be obtained by searching the serving cells of the radio terminals 1a to 1c after a change of the radio parameter, or the serving cell may be obtained by having the serving cell after a change of the radio parameter (e.g. an ID of radio cell detected by radio terminals 1a to 1c) reported from the radio terminals 1a to 1c, or the serving cell may be obtained by deciding which radio cell the radio terminals 1a to 1c move to, referring to handover information after a change of the radio parameter.

In this way, the serving cells of the radio terminals 1a to 1c, which have been connected to the surrounding radio cells of the control targeted radio cell, after a change of the radio parameter of the control targeted radio cell are obtained. Then, when the obtained serving cell is the control targeted radio cell 2, the serving cells (radio cells 3a, 3b and 3c) before a change of the radio parameter of the control targeted radio cell are taken as the evaluation targeted candidate radio cells for the control targeted radio cell 2. At this time, it is needless to say that the evaluation targeted candidate radio cell includes the control targeted radio cell 2.

Then, an evaluation targeted radio cell is selected from the evaluation targeted candidate radio cells obtained as described above. As shown in FIG. 2 and FIG. 4, all of the evaluation targeted candidate radio cells may be selected as an evaluation targeted radio cell, or an important radio cell of the evaluation targeted candidate radio cells may be selected as an evaluation targeted radio cell. Further, it is obvious that the control targeted radio cell 2 is selected as an evaluation targeted radio cell. That is, the selection method is not limited, but decided without departing from scope of the present invention timely.

Then, the radio parameter of the control targeted radio cell is evaluated based on quality of the evaluation targeted radio cell selected from the evaluation targeted candidate radio cells. For example, quality of the evaluation targeted radio cell is evaluated and necessity whether to change the radio parameter of the control targeted radio cell is decided based on the evaluate value, or quality of the evaluation targeted radio cell is evaluated after a change of the radio parameter and whether to need fallback control of the radio parameter of the control targeted radio cell is decided.

Next, a radio parameter control system of the present invention will be described with reference to the drawings.

Figure 5:
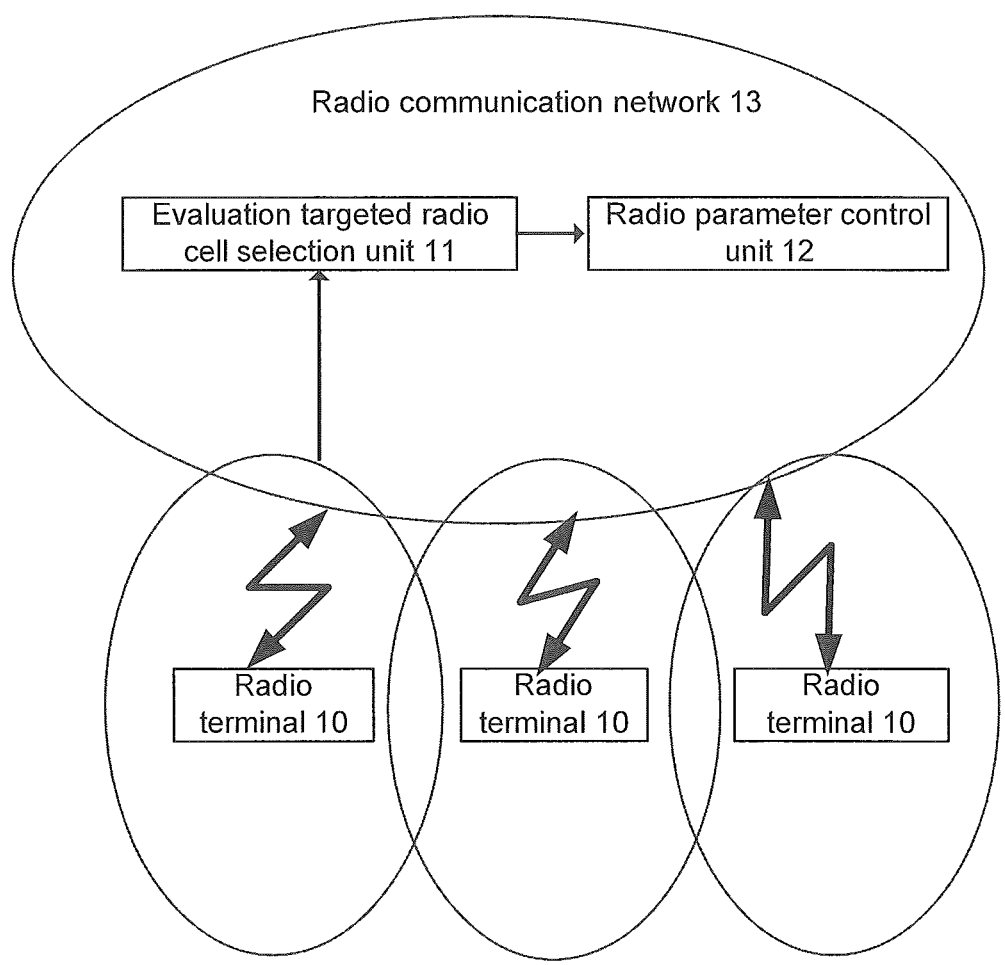
FIG. 5 is a configuration diagram of a radio parameter configuration system of the present invention.

FIG. 5 is a configuration diagram of a radio parameter configuration system of the present invention.

The radio parameter configuration system of the present invention includes a radio terminal 10, an evaluation targeted radio cell selection unit 11 and a radio parameter control unit 12. Note that a radio communication network 13 is a system to provide radio communication services to the terminal 10, and includes a radio base station, a radio parameter control apparatus and the like. Then, in the following description, a radio communication network 13 includes the evaluation targeted radio cell selection unit 11 and the radio parameter control unit 12, but each unit may be provided in either the radio base station or the radio parameter control apparatus.

Firstly, "1. The case, assuming that a radio parameter is changed to a candidate value (including radio parameter value currently set in the control targeted radio cell) without actually changing a radio parameter of a control targeted radio cell, in which a connection target radio cell of a radio terminal associated with a change of a connection range of the control targeted radio cell is predicted" described above will be described.

The radio terminal 10 has a function for measuring measurement information, for example, radio quality based on instructions from the radio communication network 13, and transmits the radio quality to the radio communication network 13. Here, examples of the radio quality measured by the radio terminal 10 are RSRP (Reference Signal Received Power) representing the received power, RSRQ (Reference Signal Received Quality) representing the received quality, SINR (Signal to Interference plus Noise Power Ratio), throughput, and other information similar thereto, as long as LTE (Long Term Evolution).

Assuming that the evaluation targeted radio cell selection unit 11 has changed the radio parameter to the predetermined candidate value without actually changing the radio parameter of the control targeted radio cell, the evaluation targeted radio cell selection unit 11 predicts a connection target radio cell of the radio terminal 10, which takes the control targeted radio cell as a serving cell or the surrounding radio cells of the control targeted radio cell as a serving cell.

The prediction of a connection target radio cell of the radio terminal 10 is made using measurement information (radio quality) collected from the radio terminal 10, which takes the control targeted radio cell as a serving cell or the surrounding radio cells of the control targeted radio cell as a serving cell in the current radio parameter settings (before a change of radio parameter). Specifically, the evaluation targeted radio cell selection unit 11 predicts how radio quality of the control target radio cell and radio quality per surrounding radio cell of the control targeted radio cell, which are collected from the radio terminal 10 as measurement information, make a change when it is assumed that changing the radio parameter of the control targeted radio cell. Then, of the predicted radio quality per radio cell, the evaluation targeted radio cell selection unit 11 predicts a radio cell with the highest radio quality as a connection target radio cell of the radio terminal when it is assumed that changing the radio parameter of the control targeted radio cell is. Note that the connection target radio cell may include not only a radio cell with the highest radio quality, but also a predetermined number of radio cells with high radio quality. The connection target radio cell may also include all of the radio cells detected by the radio terminal.

Then, of the connection target radio cells of the radio terminal 10 either before or after a change of the radio parameter, the radio terminal 10 taking the control targeted radio cell as a connection target radio cell either before or after a change of the radio parameter, the evaluation targeted radio cell selection unit 11 takes at least one or more than one radio cell excluding the control targeted radio cell as an evaluation targeted candidate radio cell. Here, taking at least one or more than one radio cell excluding the control targeted radio cell as the evaluation targeted candidate radio cell does not mean to exclude the control targeted radio cell from the evaluation targeted candidate radio cells, but it means to include at least the radio cells excluding the control targeted radio cell in the evaluation targeted candidate radio cells, the radio cells of the connection target radio cells either before or after a change of radio parameters of the control targeted radio cell, so it is needless to say that the evaluation targeted candidate radio cell includes the control targeted radio cell.

Further, in a change of the radio parameter, it is not limited to just uniformly narrowing or widening of a connection range (coverage) of the control targeted radio cell. For example, when changing a tilt angel as a radio parameter, a change may occur that a connection range (coverage) of the control targeted radio cell narrows in one area, and a connection range (coverage) of the control targeted radio cell widens in other areas. Accordingly, in the case of such a radio parameter, a connection target radio cell per radio terminal is predicted to decide the evaluation targeted candidate radio cell.

Note that in the case that there is a plurality of candidate values in one radio parameter, instead of deciding an evaluation targeted candidate radio cell per candidate value, a radio cell, which is decided to become the evaluation targeted candidate radio cell in at least any one of the candidate values, may be set as an evaluation targeted candidate radio cell common to the candidate values of the radio parameter. Further, in the case that there is a plurality of radio parameters to be controlled (e.g. transmitted power of radio cell, tilt angle of antenna, azimuth angle of antenna), a radio cell, which is decided to become an evaluation targeted candidate radio cell by control of at least one radio parameter, may be set as the evaluation targeted candidate radio cell.

Then, the evaluation targeted radio cell selection unit 11 selects at least one of the evaluation targeted candidate radio cells as an evaluation targeted radio cell for evaluating the radio parameter of the control targeted radio cell.

Note that, it conceivable as the selection method for the evaluation targeted radio cell that all of the evaluation targeted candidate radio cells may be taken as the evaluation targeted radio cells, or the evaluation targeted candidate radio cell with a high degree of importance may be selected as the evaluation targeted radio cell after obtaining degree of importance of the evaluation targeted candidate radio cells.

Next, "2. The case in which a connection target radio cell of a radio terminal is actually changed after a change of a connection range of a control targeted radio cell by actually changing the radio parameter of the control targeted radio cell, and the actual connection target radio cell (serving cell) after a change of the radio parameter is used" described above will be described.

In this case, a serving cell of the radio terminal 10 having taken a control targeted radio cell as a serving cell or surrounding radio cells of the control targeted radio cell as a serving cell before a change of the radio parameter, the serving cell after a change of the radio parameter can be obtained as a measurement value, not as a predicted value. For example, a serving cell of the radio terminal 10 after a change of the radio parameter can be decided using measurement information collected from the radio terminal 10 after a change of the radio parameter of the control targeted radio cell. For example, a serving cell of the radio terminal 10 after a change of the radio parameter may be obtained by having a new serving cell after a change of the radio parameter of the control targeted radio cell reported from the radio terminal 10. Here, the measurement information of the radio terminal 10 is not necessarily required. For example, a serving cell of the radio terminal 10 after a change of the radio parameter may be obtained using the UE trace function on the radio communication network 13. Further, a serving cell may be obtained by deciding which radio cell the radio terminal 10 moves to, referring to handover information after a change of the radio parameter. Note that, a serving cell of the radio terminal 10 before a change of the radio parameter can be obtained as a measured value in the same way.

Then, the evaluation targeted radio cell selection unit 11 takes the obtained connection target radio cell after a change of the radio parameter as the evaluation targeted candidate radio cell when an actual change of the radio parameter is made so as to narrow a connection range of the control targeted radio cell. On the other hand, the evaluation targeted radio cell selection unit 11 takes a serving cell of the radio terminal before a change of the radio parameter as the evaluation targeted candidate radio cell in the case that the obtained connection target radio cell after a change of the radio parameter is a control targeted radio cell, when an actual change of the radio parameter is made so as to widen a connection range of the control targeted radio cell. As described above, in the case of a change of the radio parameter that a connection range (coverage) of the control targeted radio cell narrows in one area, and a connection range (coverage) of the control targeted radio cell widens in other areas, the evaluation targeted radio cell selection unit 11 obtains a connection target radio cell per radio terminal, and decides the evaluation targeted candidate radio cell. For example, in the case of a change of the radio parameter, the evaluation targeted radio cell selection unit 11 takes a connection target radio cell of the radio terminal 10 after a change of the radio parameter as an evaluation targeted candidate radio cell when an actual change of the radio parameter is made so as to narrow a connection range of the control targeted radio cell for the radio terminal 10. On the other hand, in the case that a connection target radio cell of the radio terminal 10 after a change of the radio parameter is a control targeted radio cell, when an actual change of the radio parameter is made so as to widen a connection range of the control targeted radio cell for the radio terminal 10, the evaluation targeted radio cell selection unit 11 takes a serving cell of the radio terminal 10 before a change of the radio parameter as an evaluation targeted candidate radio cell. Such operations are performed per radio terminal.

Further, the evaluation targeted radio cell selection unit 11 selects at least one of the evaluation targeted candidate radio cells as an evaluation targeted radio cell for evaluating the radio parameter of the control targeted radio cell. Note that, as described above, it is needless to say that the evaluation targeted candidate radio cell includes the control targeted radio cell.

Note that, it conceivable as a selection method for the evaluation targeted radio cell that all of the evaluation targeted candidate radio cells may be the evaluation targeted radio cells, or the evaluation targeted candidate radio cell with a high degree of importance may be selected as the evaluation targeted radio cell after obtaining degree of importance of the evaluation targeted candidate radio cells.

Next, the above-described importance degree of an evaluation targeted candidate radio cell will be described. Note that the method for obtaining the importance degree of the evaluation targeted candidate radio cell described below can be applied to both ideas of "1" and "2" described above.

(1) The importance degree of an evaluation targeted candidate radio cell is obtained such that the evaluation targeted candidate radio cell having a high number of radio terminals, which move from a control targeted radio cell as a new connection target radio cell (serving cell), is provided with a relatively high importance degree.

(2) The importance degree of an evaluation targeted candidate radio cell is obtained such that the evaluation targeted candidate radio cell having a high increase rate in the number of radio terminals, which move from a control targeted radio cell as a new connection target radio cell (serving cell), is provided with a relatively high importance degree. For example, the increase rate is expressed as follows:
(The number of radio terminals taking an evaluation targeted candidate radio cell as a connection target radio cell (serving cell) after a change of the radio parameter of the control targeted radio cell minus(−) the number of radio terminals taking the evaluation targeted candidate radio cell as a serving cell before a change of the radio parameter of the control targeted radio cell) divided by (The number of radio terminals taking the evaluation targeted candidate radio cell as a serving cell before a change of the radio parameter of the control targeted radio cell)

(3) The importance degree of an evaluation targeted candidate radio cell is obtained such that the evaluation targeted candidate radio cell having a high number of handovers performed with a control targeted radio cell is provided with a relatively high importance degree.

Note that, in above-described description, a connection target radio cell (serving cell) by a change of the radio parameter of the control targeted radio cell is taken as an evaluation targeted candidate radio cell, the destination cell of the radio terminal 10 taking a control targeted radio cell as a serving cell. However, the method for obtaining an evaluation targeted candidate radio cell is not limited thereto. For example, an evaluation targeted candidate radio cell obtained in the above-described method is taken as a temporary control targeted radio cell. Then, by assuming that a radio parameter of the temporary control targeted radio cell is changed, or by actually changing the radio parameter, it is possible to include a second evaluation targeted candidate radio cell, which is a connection target radio cell (serving cell) of the radio terminal taking the temporary control targeted radio cell as a serving cell, as an evaluation targeted candidate radio cell for the control targeted radio cell. Here, it is possible to avoid increasing the number of the evaluation targeted candidate radio cells unnecessarily by taking only the evaluation targeted candidate radio cells with a high degree of importance as a temporary control targeted radio cell for obtaining the second evaluation targeted candidate radio cell.

The radio parameter control unit 12 performs control to change or maintain a radio parameter based on quality of an evaluation targeted radio cell selected by the evaluation targeted radio cell selection unit 11. For example, the radio parameter control unit 12 changes a radio parameter of the control targeted radio cell taking quality deterioration of the evaluation targeted radio cell as a trigger, or the radio parameter control unit 12 performs fallback of a radio parameter when quality deterioration is detected in an evaluation targeted radio cell after a change of the radio parameter of the control targeted radio cell. Note that the specific examples of a radio parameter are maximum transmitted power of downlink signals in a radio cell, transmitted power of pilot signals or reference signals, a tilt angle of an antenna, an azimuth angle of an antenna and the like. Further, CIO (Cell Individual Offset) or Qoffset may be used as a radio parameter.

Further, the quality of an evaluation targeted radio cell is traffic burden of an evaluation targeted radio cell, average throughput, an abnormal cut-off rate, a handover failure and the like. Note that only the quality of an evaluation targeted radio cell may be evaluated, but the quality of a radio cell other than an evaluation targeted radio cell may be evaluated while putting a high emphasis on the quality of the evaluation targeted radio cell. Further, as described above, when importance degree of an evaluation targeted radio cell is obtained, an evaluation targeted radio cell with the high importance degree may be evaluated with emphasis.

In this way, according to the present invention, it is possible to precisely understand the effects of control of a radio parameter by setting an evaluation targeted radio cell for evaluating a radio parameter of the control targeted radio cell properly.

Hereafter, the embodiments of the present invention will be described.

First Embodiment

A first embodiment of the present invention will be described. In the first embodiment, assuming that a radio parameter is changed to a candidate value (including radio parameter value currently set in control targeted radio cell) without actually changing a radio parameter of a control targeted radio cell, a connection target radio cell is predicted, and an evaluation targeted candidate radio cell is decided based on the connection target radio cell.

Figure 6:
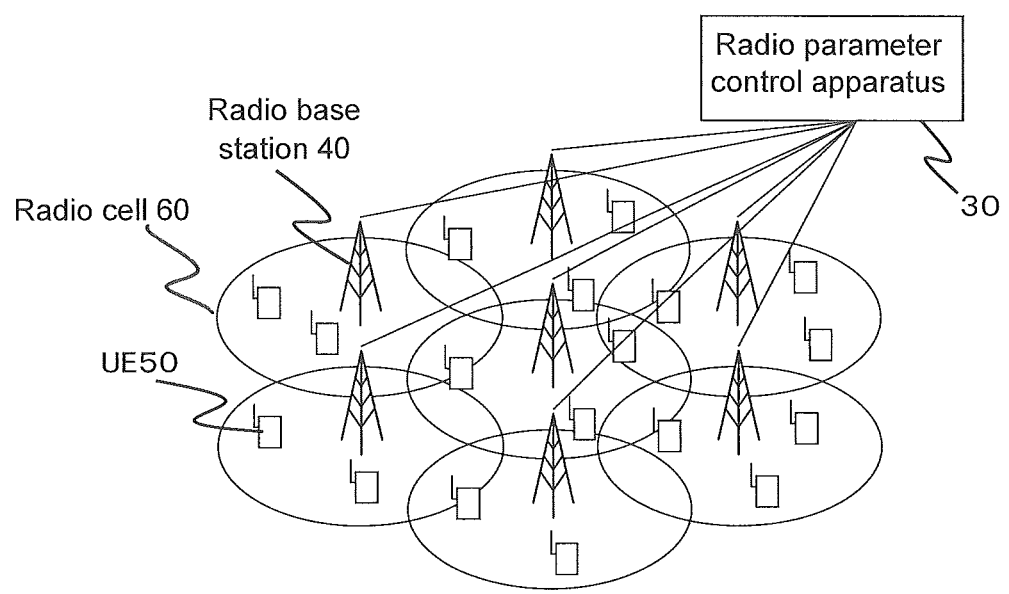
FIG. 6 is a configuration diagram of a radio communication system of the first embodiment.

FIG. 6 is a configuration diagram of a radio communication system of the first embodiment.

The radio communication system of the first embodiment includes radio parameter control apparatus 30, radio base station 40 and a plurality of radio terminals 50 (hereafter, it will be referred to as UE).

The UE 50 has a function to measure measurement information (radio quality). The radio quality includes measurement results of the radio quality of a radio cell (serving cell) to which the UE 50 is connected. Further, the radio quality may include the measurement results of the radio quality of surrounding radio cells other than a serving cell of the UE 50. A typical example of the radio quality measured by the UE 50 is received quality of radio signals (downlink signals) transmitted from the radio base station 40.

The received quality is, for example, received power of downlink pilot signals or downlink reference signals, or SINR (Signal to Interference plus Noise Power Ratio). In the case of W-CDMA, the radio quality measured by the UE 50 is received power (CPCIH RSCP (Received Signal Code Power)) of a common pilot channel (CPICH) per radio cell, or a ratio of energy per chip of the CPICH to in-band received power density (EC/No). Further, in the case of LTE (Long Term Evolution), the radio quality measured by the UE 50 is received power (RSRP: Reference Signal Received Power) of the downlink reference signals, or received quality (RSRQ: Reference Signal Received Quality) thereof.

Further, the radio quality may include communication quality such as throughput or BLER (Block Error Rate), event information such as whether or not an abnormal cut-off rate and a handover failure will occur, the time at which the UE measures the radio quality, an identifier of a radio cell corresponding to each radio quality, and an UE's identifier.

Then, the UE 50 transmits the measured radio quality to the radio base station 40.

The radio base station 40 manages the radio cell 60 and performs bidirectional radio communication with a plurality of the UEs 50. Then, the radio base station 40 has a function to collect the radio quality measured by the UE 50 under the control of the radio base station 40, and notify the radio parameter control apparatus 30 of the radio quality information. The radio base station 40 may also notify the radio parameter control apparatus 30 of performance counter information (e.g. the number of communication occurrences, the number of handovers, a usage rate of resource blocks, traffic burden, an abnormal cut-off rate and a failure rate of handover). Further, the radio base station 40 has a function to change a radio parameter of the radio base station 40, or a radio parameter of a radio cell managed by the radio base station 40 according to the radio parameter decision results in the radio parameter control apparatus 30. Note that, in FIG. 6, the mode in which each radio base station 40 manages one radio cell 60 is described, but it is not limited thereto. That is, the mode in which each radio base station 40 manages a plurality of radio cells 60 may be possible.

The radio parameter control apparatus 30 has a function to decide a radio parameter of the radio base station 40 or the radio cell 60 based on radio quality or performance counter information reported from the radio base station 40, and notify the radio base station 40 of the results.

Next, a configuration of the radio parameter control apparatus 30 will be described.

Figure 7:
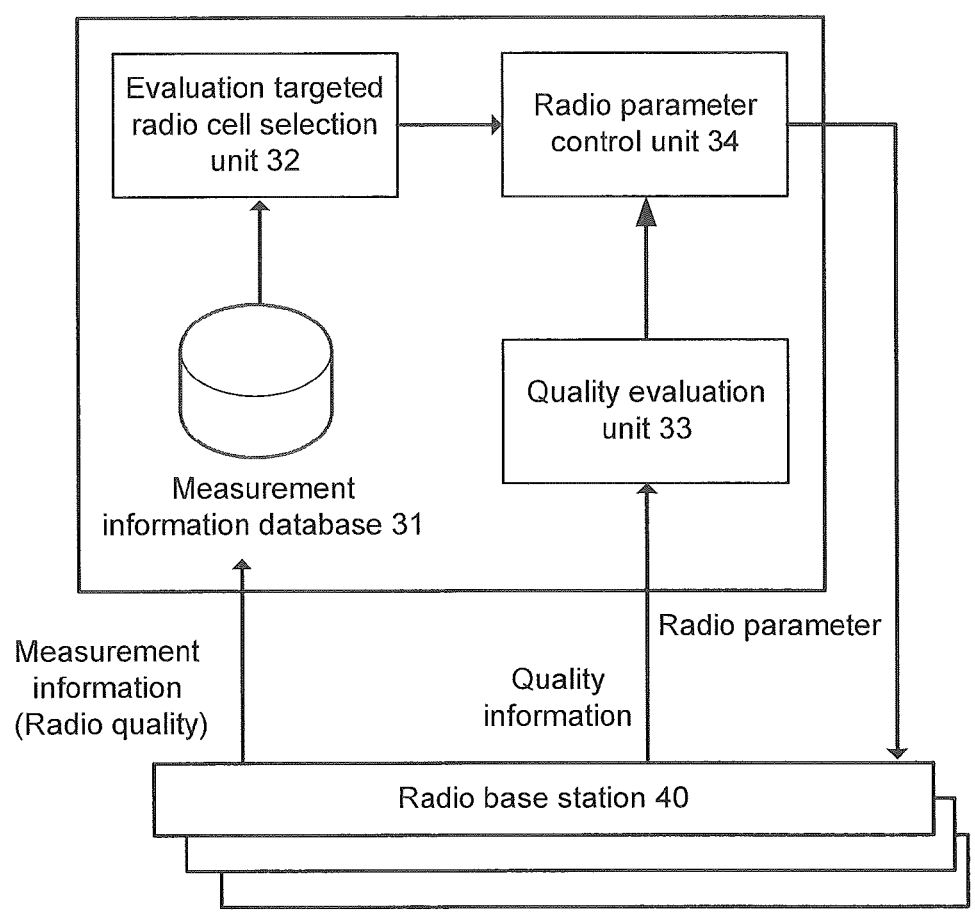
FIG. 7 is a block diagram of a radio parameter control apparatus 30.

FIG. 7 is a block diagram of the radio parameter control apparatus 30.

As shown in FIG. 7, the radio parameter control apparatus 30 includes a measurement information database 31, an evaluation targeted radio cell selection unit 32, a quality evaluation unit 33 and a radio parameter control unit 34.

The measurement information database 31 is a database that registers radio quality or performance counter information of a radio terminal reported from the radio base station 40.

The evaluation targeted radio cell selection unit 32 selects a radio cell to be taken into consideration as an evaluation targeted radio cell so as to evaluate a radio parameter of a control targeted radio cell. Specifically, when it is assumed that a radio parameter of the control targeted radio cell is changed to a candidate value, the evaluation targeted radio cell selection unit 32 predicts a connection target radio cell of the UE 50 taking the control targeted radio cell as a serving cell or taking the surrounding radio cells of the control targeted radio cell as a serving cell using measurement information (radio quality) measured by the UE 50, and selects evaluation targeted candidate radio cells based on the predicted destination cell.

In the following, a specific example in the case that the received power (RSRP(Reference Signal Received Power)) per radio cell is measured as measurement information, and transmitted power is reduced as a radio parameter of a radio cell will be described.

Firstly, of the measurement information measured and reported by the UE 50, the measurement information of the UE 50 taking a control targeted radio cell as a serving cell is referred to as (RSRPs, RSRPn1, RSRPn2, . . . , RSRPni). Here, RSRPs is the RSRP [dBm] of a serving cell, and RSRPni is the RSRP [dBm] of a radio cell i other than the serving cell. When it is assumed that transmitted power of the control targeted radio cell has been changed from Pr [dBm] that is a current setting value to a candidate value Pc [dBm], the RSRP per radio cell can be predicted as (RSRPs-(Pr-Pc), RSRPn1, RSRPn2, . . . , RSRPni) by evaluating that only the RSRP of the control targeted radio cell is changed by a change amount of the transmitted power. Then, a radio cell with the highest RSRP of the predicted RSRP per radio cell is predicted as a connection target radio cell to which the UE 50 is connected, when it is assumed that transmitted power of the control targeted radio cell has been changed from Pr [dBm] that is a current setting value to a candidate value Pc [dBm], and the radio cell is included as an evaluation targeted candidate radio cell. Note that, at this time, not only a radio cell with the highest RSRP, but a top predetermined number of radio cells, like top three radio cells, may be included as an evaluation targeted candidate radio cell. In this case, it is not necessary to predict the radio quality. Note that the RSRP case has been described above, but it is not limited thereto. For example, there may be RSRQ, SINR, throughput and information similar thereto.

Next, a specific example in the case that received power (RSRP(Reference Signal Received Power)) per radio cell is measured as measurement information, and transmitted power is increased as a radio parameter of a radio cell will be described.

Firstly, of the measurement information measured and reported by the UE 50, the measurement information of the UE 50 taking surrounding radio cells of the control targeted radio cell as a serving cell is referred to as (RSRPs, RSRPc, RSRPn1, RSRPn2, . . . , RSRPni). Here, RSRPs is the RSRP [dBm] of a serving cell, RSRPc is the RSRP [dBm] of the control targeted radio cell and RSRPni is the RSRP [dBm] of a radio cell i other than a serving cell and the radio targeted radio cell. The surrounding radio cells of the control targeted radio cell may be radio cells within a predetermined distance from the control targeted radio cell or radio cells registered in a list of neighboring cells of the control targeted radio cell. When it is assumed that transmitted power of the control targeted radio cell has been changed from Pr [dBm] that is a current setting value to a candidate value Pc [dBm], the RSRP per radio cell can be predicted as (RSRPs, RSRPc-(Pc-Pr), RSRPn1, RSRPn2, . . . , RSRPni) by evaluating that only the RSRP of the control targeted radio cell is changed by only a change amount of the transmitted power. Then, a radio cell with the highest RSRP of the predicted RSRP per radio is predicted as a connection target radio cell to which the UE 50 is connected, when it is assumed that transmitted power of the control targeted radio cell has been changed from Pr [dBm] that is a current setting value to a candidate value Pc [dBm]. Note that, at this time, not only a radio cell with the highest RSRP, but a top predetermined number of radio cells, like top three radio cells, may be predicted as a connection target radio cell. In this way, a connection target radio cell when it is assumed that transmitted power of the control targeted radio cell has been changed to a candidate value Pc [dBm] is predicted per measurement information, and when the predicted destination cell is the control targeted radio cell, a serving cell before a change of a radio parameter of the measurement information (that is, in the current setting value) is included in an evaluation targeted candidate radio cell. Note that the RSRP case has been described above, but it is not limited thereto. For example, there may be RSRQ, SINR, throughput and information similar thereto.

Note that in the case that there is a plurality of candidate values in one radio parameter, instead of deciding an evaluation targeted candidate radio cell per candidate value, a radio cell, which is decided to become the evaluation targeted candidate radio cell in at least any one of the candidate values, may be set as an evaluation targeted candidate radio cell common to the candidate values of the radio parameter.

When selecting an evaluation targeted radio cell from evaluation targeted candidate radio cells, all the evaluation targeted candidate radio cells may be selected as the evaluation targeted radio cell, or the evaluation targeted candidate radio cell with the high importance degree may be selected as the evaluation targeted radio cell.

As described above, the methods for obtaining importance degree of the evaluation targeted candidate radio cell are as follows:

(1) The importance degree of an evaluation targeted candidate radio cell is obtained such that the evaluation targeted candidate radio cell having a high number of radio terminals, which move from a control targeted radio cell as a new connection target radio cell (serving cell), is provided with a relatively high importance degree;

(2) The importance degree of an evaluation targeted candidate radio cell is obtained such that the evaluation targeted candidate radio cell having a high increase rate in the number of radio terminals, which move from a control targeted radio cell as a new connection target radio cell (serving cell), is provided with a relatively high importance degree. For example, the increase rate is expressed as follows:
(The number of radio terminals taking an evaluation targeted candidate radio cell as a connection target radio cell (serving cell) after a change of the radio parameter of the control targeted radio cell minus(−) the number of radio terminals taking the evaluation targeted candidate radio cell as a serving cell before a change of the radio parameter of the control targeted radio cell) divided by (The number of radio terminals taking the evaluation targeted candidate radio cell as a serving cell before a change of the radio parameter of the control targeted radio cell)

(3) The importance degree of an evaluation targeted candidate radio cell is obtained such that the evaluation targeted candidate radio cell having a high number of handovers performed with a control targeted radio cell is provided with a relatively high importance degree.

The number of evaluation targeted candidate radio cells to become an evaluation targeted radio cell may be reduced based on the importance degree obtained in this way.

Further, the evaluation targeted radio cell 32 may take a radio cell which is predicted as an evaluation targeted candidate radio cell, as a temporary control targeted radio cell, obtain an evaluation targeted radio cell for the temporary control targeted radio cell through the operations similar to what is described above, and include such cells as an evaluation targeted candidate radio cell for the original control targeted radio cell. Note that, in this case, only evaluation targeted candidate radio cell with the high importance degree may be a temporary control targeted radio cell for obtaining new evaluation targeted candidate radio cells. For this reason, it is possible to avoid an unnecessary increase of the evaluation targeted candidate radio cells.

The quality evaluation unit 33 evaluates quality of an evaluation targeted radio cell. The quality to be evaluated is traffic burden (e.g. a usage rate of resource blocks), an abnormal cut-off rate of communication, a failure rate of handover, average throughput and the like in each evaluation targeted radio cell. Note that the quality evaluation unit 33 evaluates not only the quality of the evaluation targeted radio cell, but also evaluates quality of the surrounding radio cells. At this time, the quality evaluation unit 33 distinguishes the evaluation targeted radio cell from other radio cells to evaluate the quality. For example, the quality evaluation unit 33 put emphasis on the quality of the evaluation targeted radio cell to evaluate the quality with emphasis as compared with the quality of other radio cells. The quality evaluation unit 33 outputs the results of the quality evaluation to the radio parameter control unit 34.

The radio parameter control unit 34 decides whether to change a radio parameter of a control targeted radio cell using the quality evaluation results of an evaluation targeted radio cell selected for the control targeted radio cell, and decides a changed value of the radio parameter. For example, the radio parameter control unit 34 changes a radio parameter of the control targeted radio cell taking quality deterioration of the evaluation targeted radio cell as a trigger, or the radio parameter control unit 34 performs fallback of a radio parameter when quality deterioration is detected in an evaluation targeted radio cell after a change of the radio parameter of the control targeted radio cell. Note that the specific examples of a radio parameter are maximum transmitted power of downlink signals in a radio cell, transmitted power of pilot signals or reference signals, a tilt angle of an antenna, an azimuth angle of an antenna and the like. Further, CIO (Cell Individual Offset) or Qoffset may be used as a radio parameter.

Next, an example of the operation in the first embodiment will be described.

Figure 8:
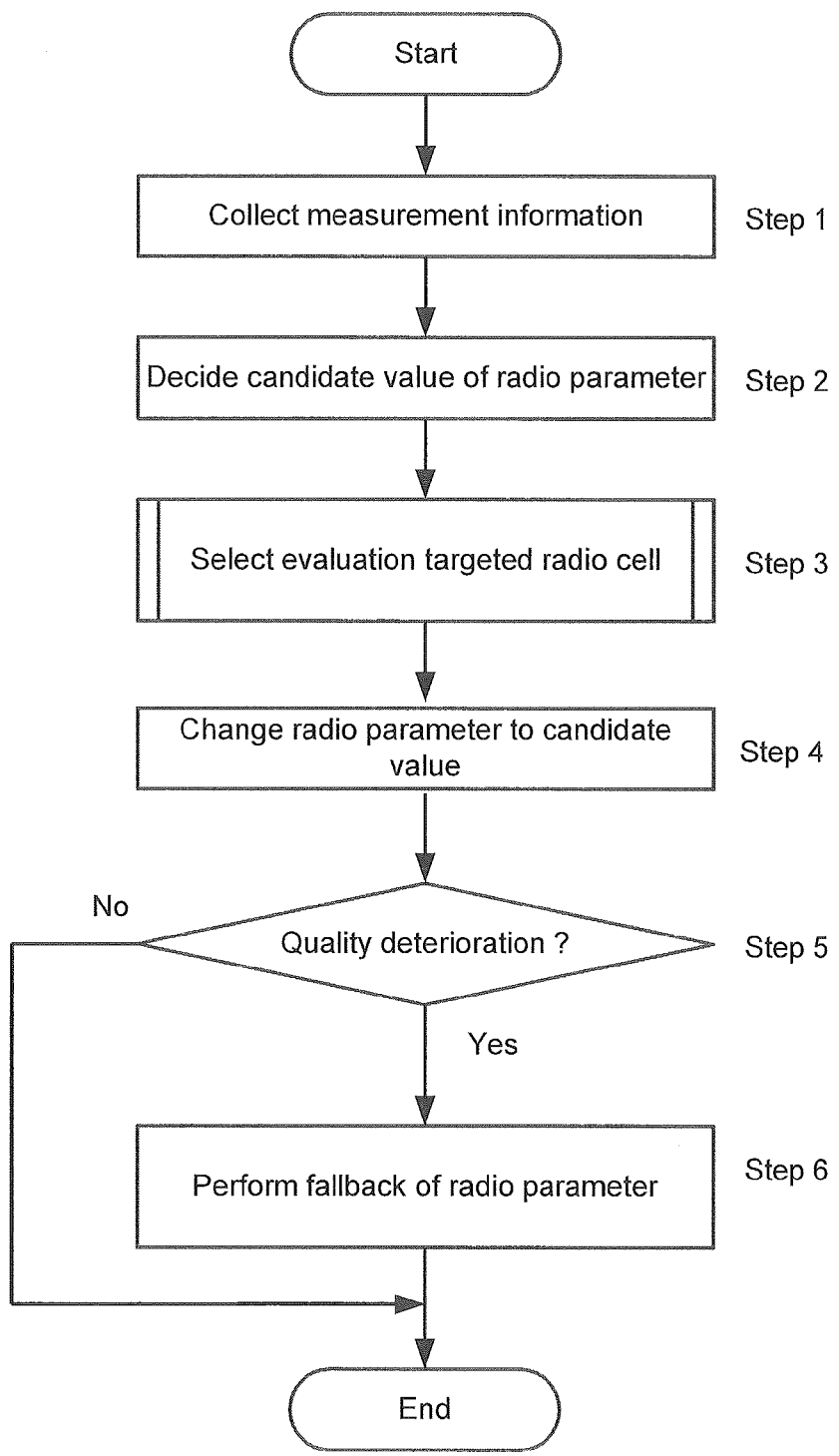
FIG. 8 is a flowchart of the overall operation in one example of the first embodiment.

FIG. 8 is a flowchart of the overall operation of the first embodiment.

Firstly, the radio parameter control apparatus 30 collects measurement information (radio quality) measured by the UE 50, taking a control targeted radio cell as a serving cell or the surrounding radio cells of the control targeted radio cell as a serving cell, through the radio base station 40, and registers in the measurement information database 31 (Step 1). Next, the radio parameter control unit 34 of the radio parameter control apparatus 30 decides a candidate value of a radio parameter of the control targeted radio cell (Step 2).

Subsequently, the evaluation targeted radio cell selection unit 32 of the radio parameter control apparatus 30 selects an evaluation targeted radio cell for evaluating whether a setting value of the radio parameter of the control targeted radio cell is appropriate (Step 3). Note that the selection operation will be described later.

Next, the radio parameter control unit 34 of the radio parameter control apparatus 30 changes a radio parameter of the control targeted radio cell to a candidate value decided in Step 2 (Step 4).

The quality evaluation unit 33 of the radio parameter control apparatus 30 evaluates quality of the evaluation targeted radio cell (Step 4). Then, when quality deterioration of the evaluation targeted radio cell is detected, the radio parameter control unit 34 of the radio parameter control apparatus 30 performs fallback of a radio parameter (Step 5). On the other hand, when quality deterioration of the evaluation targeted radio cell is not detected, the radio parameter control unit 34 of the radio parameter control apparatus 30 terminates the operations without performing fallback of a radio parameter. Note that fallback is just the example, it is not limited thereto. For example, when quality deterioration of the evaluation targeted radio cell is detected, the radio parameter control unit 34 of the radio parameter control apparatus 30 may perform control for changing to a candidate value of a new radio parameter instead of changing back the radio parameter to a state before the change.

Subsequently, the operation for selecting an evaluation targeted radio cell for the control targeted radio cell (Step 3) will be described in detail.

Figure 9:
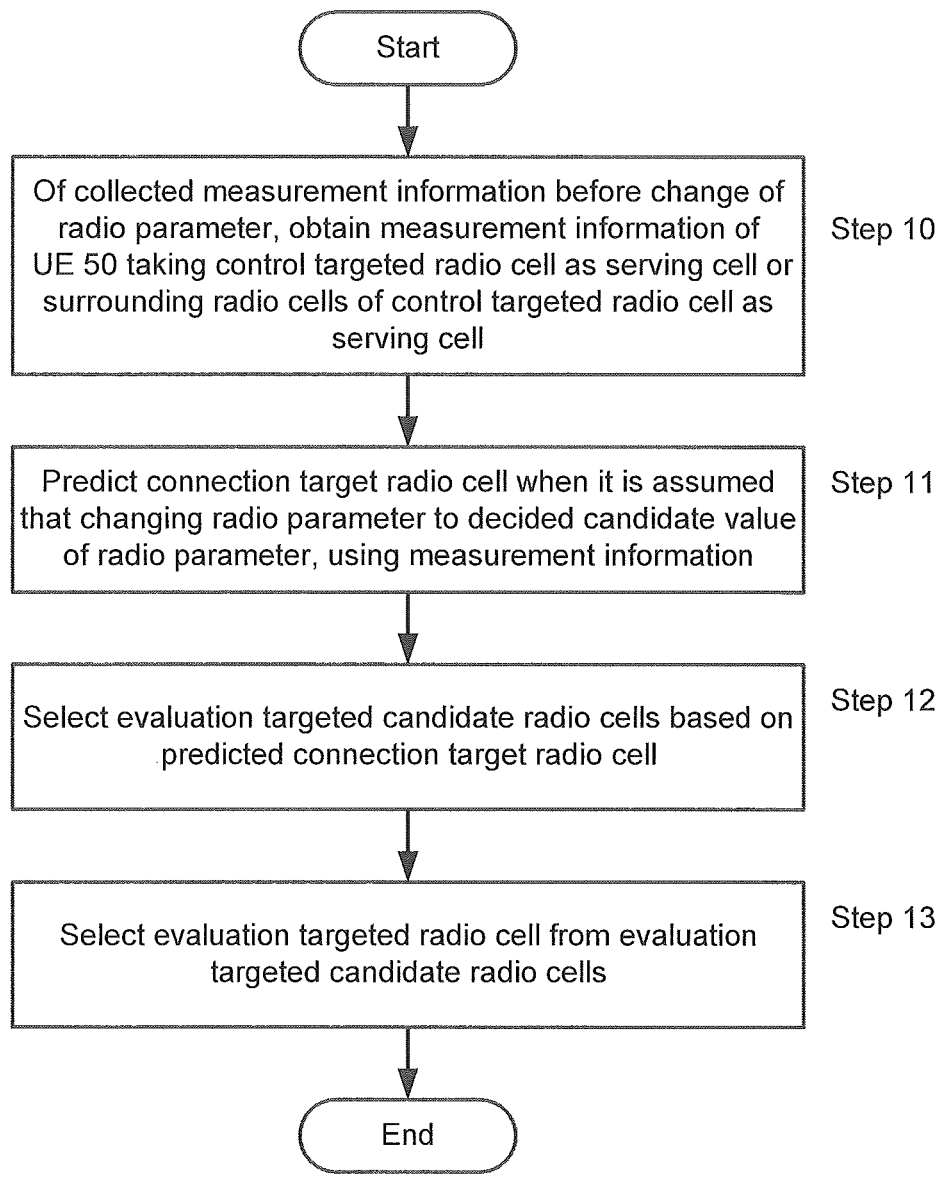
FIG. 9 is a flowchart of an evaluation targeted radio cell selection unit 32 in one example of the first embodiment.

FIG. 9 is a flowchart of the evaluation targeted radio cell selection unit 32.

Firstly, of the measurement information (radio quality) of the UE 50, which is collected in Step 1 of FIG. 8, before a change of a radio parameter of the control targeted radio cell (before actually changing a radio parameter), the evaluation targeted radio cell selection unit 32 obtains the measurement information (radio quality) of the UE 50 taking the control targeted radio cell as a serving cell or the surrounding radio cells of the control targeted radio cell as a serving cell (Step 10).

Next, the evaluation targeted radio cell selection unit 32 predicts how radio quality of the control targeted radio cell of the UE 50 and of each surrounding radio cell of the UE 50, taking the obtained control targeted radio cell as a serving cell or the surrounding radio cells of the control targeted radio cell as a serving cell, make a change assuming in the case that changing a radio parameter to a candidate value of the radio parameter decided in Step 2 of FIG. 8, and predicts a radio cell with the highest radio quality of the predicted radio quality of each radio cell as a connection target radio cell of the UE 50 for the candidate value of the radio parameter decided in Step 2 of FIG. 8 (Step 11).

Next, the evaluation targeted radio cell selection unit 32 selects evaluation targeted candidate radio cells based on the predicted connection target radio cell (Step 12). Specifically, when a predetermined value of the radio parameter is made so as to narrow a connection range of the control targeted radio cell for the UE 50 and change a connection target radio cell of the UE 50 from the control targeted radio cell to other radio cells, the predicted connection target radio cell of the UE 50 is taken as an evaluation targeted candidate radio cell. On the other hand, when a predetermined value of the radio parameter is made so as to widen a connection range of the control targeted radio cell for the UE 50 and change a connection target radio cell of the UE 50 from the surrounding radio cells to the control targeted radio cell, in the case that the predicted connection target radio cell of the UE 50 is the control targeted radio cell, the evaluation targeted radio cell selection unit 32 takes a serving cell before a change of the radio parameter of the UE 50 (before actually changing a radio parameter) as an evaluation targeted candidate radio cell. Such operations are performed per UE 50.

Note that, when there is a plurality of candidate values in a radio parameter to be controlled, the evaluation targeted radio cell selection unit 32 may obtain evaluation targeted candidate radio cells using only one candidate value of a radio parameter, or obtain evaluation targeted candidate radio cells as to all candidate values of the radio parameter and set a radio cell decided to become an evaluation targeted candidate radio cell in at least any one of the candidate values as an evaluation targeted candidate radio cell. Such operations are performed per UE 50.

Lastly, the evaluation targeted radio cell selection unit 32 selects an evaluation targeted radio cell from the evaluation targeted candidate radio cells (Step 13). The method for selecting the evaluation targeted radio cell from the evaluation targeted candidate radio cells is the same as the one described above.

According to the example of the embodiment described above, it is possible to control unnecessary fallback operations of a radio parameter by setting a radio cell taken as an evaluation target properly.

Next, another example of the embodiments will be described.

According to the example of the embodiment described above, the example of performing fallback of a radio parameter is described when quality deterioration is detected in an evaluation targeted radio cell after a change of the radio parameter of the control targeted radio cell. In the example below, the example in which an evaluation targeted radio cell for a control targeted radio cell is set in advance and a radio parameter of the control targeted radio cell is changed taking quality deterioration of the evaluation targeted radio cell as a trigger will be described. Note that the detailed description will be omitted as to what is similar to the example of the embodiment described above.

Figure 10:
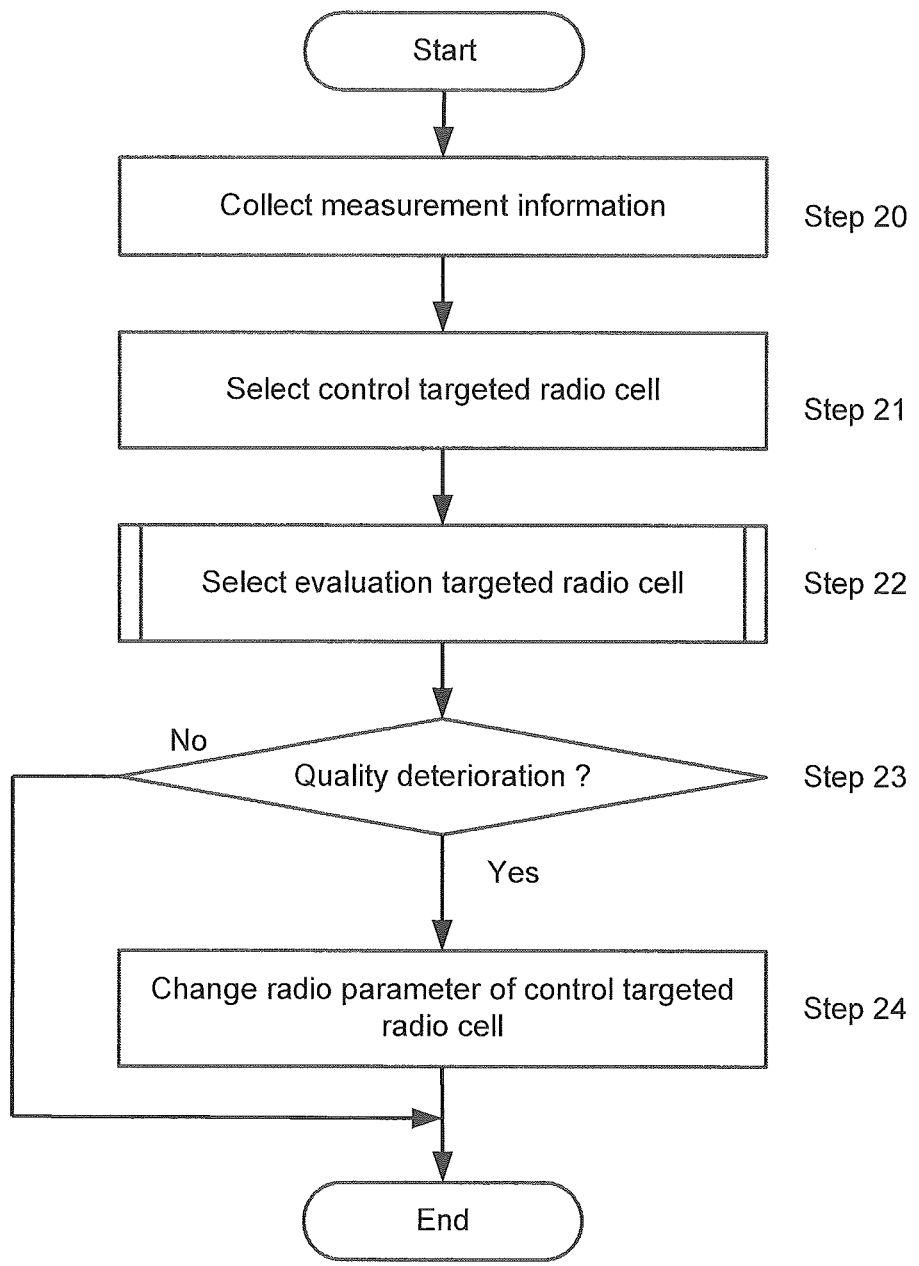
FIG. 10 is a flowchart of the overall operation in another example of the first embodiment.

FIG. 10 is a flowchart of the overall operation in another example of the embodiment.

Firstly, the radio parameter control apparatus 30 collects measurement information (radio quality) measured by the UE 50, taking a control targeted radio cell as a serving cell or the surrounding radio cells of the control targeted radio cell as a serving cell, through the radio base station 40, and registers in the measurement information database 31 (Step 20). Next, the radio parameter control apparatus 30 selects the control targeted radio cell for controlling a radio parameter. (Step 21). Subsequently, the evaluation targeted radio cell selection unit 32 of the radio parameter control apparatus 30 selects an evaluation targeted radio cell for the control targeted radio cell (Step 22). Note that the selection operations will be described later.

The quality evaluation 33 of the radio parameter control apparatus 30 evaluates quality of the evaluation targeted radio cell (Step 23). Then, when quality deterioration of the evaluation targeted radio cell is detected, the radio parameter control unit 34 of the radio parameter control apparatus 30 changes a radio parameter of the control targeted radio cell. (Step 24). On the other hand, when quality deterioration of the evaluation targeted radio cell is not detected, the radio parameter control unit 34 of the radio parameter control apparatus 30 terminates the operations.

Figure 11:
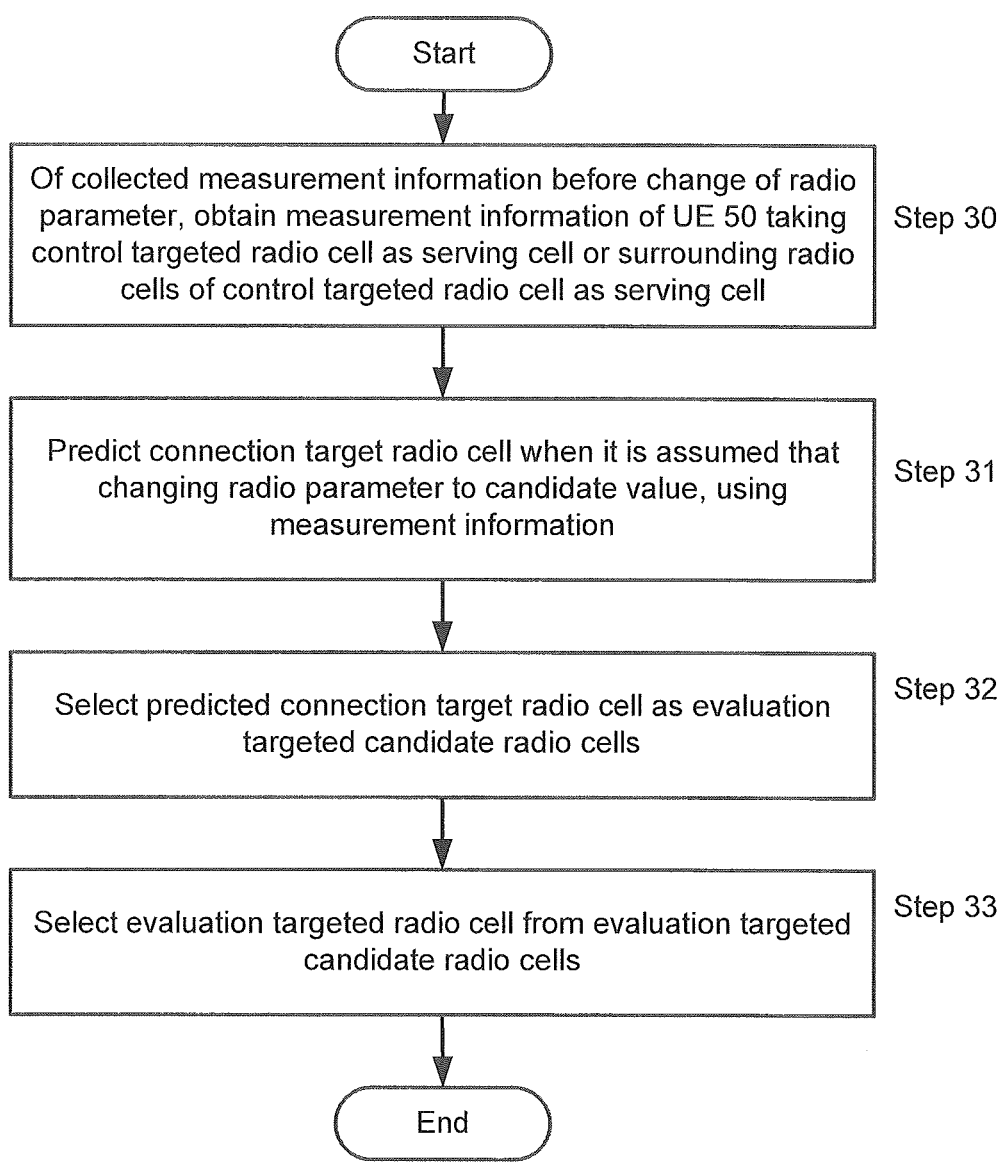
FIG. 11 is a flowchart of the evaluation targeted radio cell selection unit 32 in another example of the first embodiment.

FIG. 11 is a flowchart of the evaluation targeted radio cell selection unit 32.

Firstly, the evaluation targeted radio cell selection unit 32 obtains the measurement information (radio quality) of the UE 50 taking the control targeted radio cell as a serving cell or the surrounding radio cells of the control targeted radio cell as a serving cell (Step 30).

Next, as to the obtained measurement information (radio quality), the evaluation targeted radio cell selection unit 32 predicts how radio quality of the control targeted radio cell and of each surrounding radio cell make a change assuming in the case that changing a radio parameter of the control targeted radio cell to a candidate value. Then, the evaluation targeted radio cell selection unit 32 predicts a radio cell with the highest radio quality of the predicted radio quality of each radio cell as a connection target radio cell of the UE 50 when it is assumed that changing a radio parameter of the control targeted radio cell to the candidate value (Step 31).

Next, the evaluation targeted radio cell selection unit 32 selects evaluation targeted candidate radio cells based on the predicted connection target radio cell (Step 32). Specifically, when a predetermined value of the radio parameter is made so as to narrow a connection range of the control targeted radio cell for the UE 50 and change a connection target radio cell of the UE 50 from the control targeted radio cell to other radio cells, the predicted connection target radio cell of the UE 50 is taken as an evaluation targeted candidate radio cell. On the other hand, when a predetermined value of the radio parameter is made so as to widen a connection range of the control targeted radio cell for the UE 50 and change a connection target radio cell of the UE 50 from the surrounding radio cells to the control targeted radio cell, in the case that the predicted connection target radio cell of the UE 50 is the control targeted radio cell, the evaluation targeted radio cell selection unit 32 takes a serving cell before a change of the radio parameter of the UE 50 (before actually changing a radio parameter) as an evaluation targeted candidate radio cell. Such operations are performed per UE 50.

Further, as to the candidate values of a radio parameter, when there is only one candidate value excluding the current setting values of all candidate values of the radio parameter, the evaluation targeted radio cell selection unit 32 may use the candidate value excluding the current setting values. Further, when there is a plurality of candidate values in a radio parameter, the evaluation targeted radio cell selection unit 32 may use a predetermined candidate value or a current candidate value of the radio parameter made to change the coverage of the control targeted radio cell most greatly. Further, there is a plurality of candidate values in a radio parameter to be controlled, the evaluation targeted radio cell selection unit 32 may obtain evaluation targeted candidate radio cells as to all candidate values of the radio parameter and set a radio cell decided to become an evaluation targeted candidate radio cell in at least any one of the candidate values, as an evaluation targeted candidate radio cell.

Lastly, the evaluation targeted radio cell selection unit 32 selects an evaluation targeted radio cell from the evaluation targeted candidate radio cells (Step 33). The method for selecting the evaluation targeted radio cell from the evaluation targeted candidate radio cells is the same as the one described above.

According to the example of the embodiment described above, it is possible to control an unnecessary change of a radio parameter by setting a radio cell taken as an evaluation target properly, when deciding the necessity for controlling a radio parameter of a radio cell.

Second Embodiment

The second embodiment will be described.

In the second embodiment, an evaluation targeted radio cell is decided by obtaining a new connection target radio cell of a radio terminal (serving cell) by a change of a radio parameter of a control targeted radio cell, as a measured value, not as a predicted value. Note that the description will be omitted as to what is similar to the first embodiment, but it will be described as to what is different from the first embodiment.

The evaluation targeted radio cell selection unit 32 obtains a serving cell of the UE 50 after a change of a radio parameter of a control targeted radio cell using measured values but not predicted values, the UE 50 having taken the control targeted radio cell as a serving cell or the surrounding radio cells of the control targeted radio cell as a serving cell. For example, the evaluation targeted radio cell selection unit 32 can decide a serving cell of the UE 50 after a change of a radio parameter, using the measurement information collected from the UE 50 after a change of a radio parameter of the control targeted radio cell. For example, the evaluation targeted radio cell selection unit 32 obtains a serving cell of the UE 50 after a change of a radio parameter by having a new serving cell after a change of the radio parameter of the control targeted radio cell reported from the UE 50. Here, the measurement information of the UE 50 is not necessarily required. For example, the evaluation targeted radio cell selection unit 32 obtains a serving cell of the UE 50 after a change of the radio parameter using the UE trace function on the core network to take the serving cell as an evaluation targeted candidate radio cell. Further, the evaluation targeted radio cell selection unit 32 decides which radio cell the UE 50 moves to, referring to handover information after a change of the radio parameter, to take the radio cell as an evaluation targeted candidate radio cell. Note that the evaluation targeted radio cell selection unit 32 can obtain a serving cell of the UE 50 before a change of the radio parameter as a measured value in the same way.

The evaluation targeted radio cell selection unit 32 selects at least one of the obtained evaluation targeted candidate radio cells as an evaluation targeted radio cell. The method for selecting the evaluation targeted radio cell from the evaluation targeted candidate radio cells is the same as the one described above.

The radio parameter control unit 34 decides whether to change a radio parameter of the control targeted radio cell, using the quality evaluation results of the evaluation targeted radio cell that is selected for the control targeted radio cell, and decides a changed value of the radio parameter or performs fallback of the radio parameter.

Next, an example of the operation in the second embodiment will be described.

Figure 12:
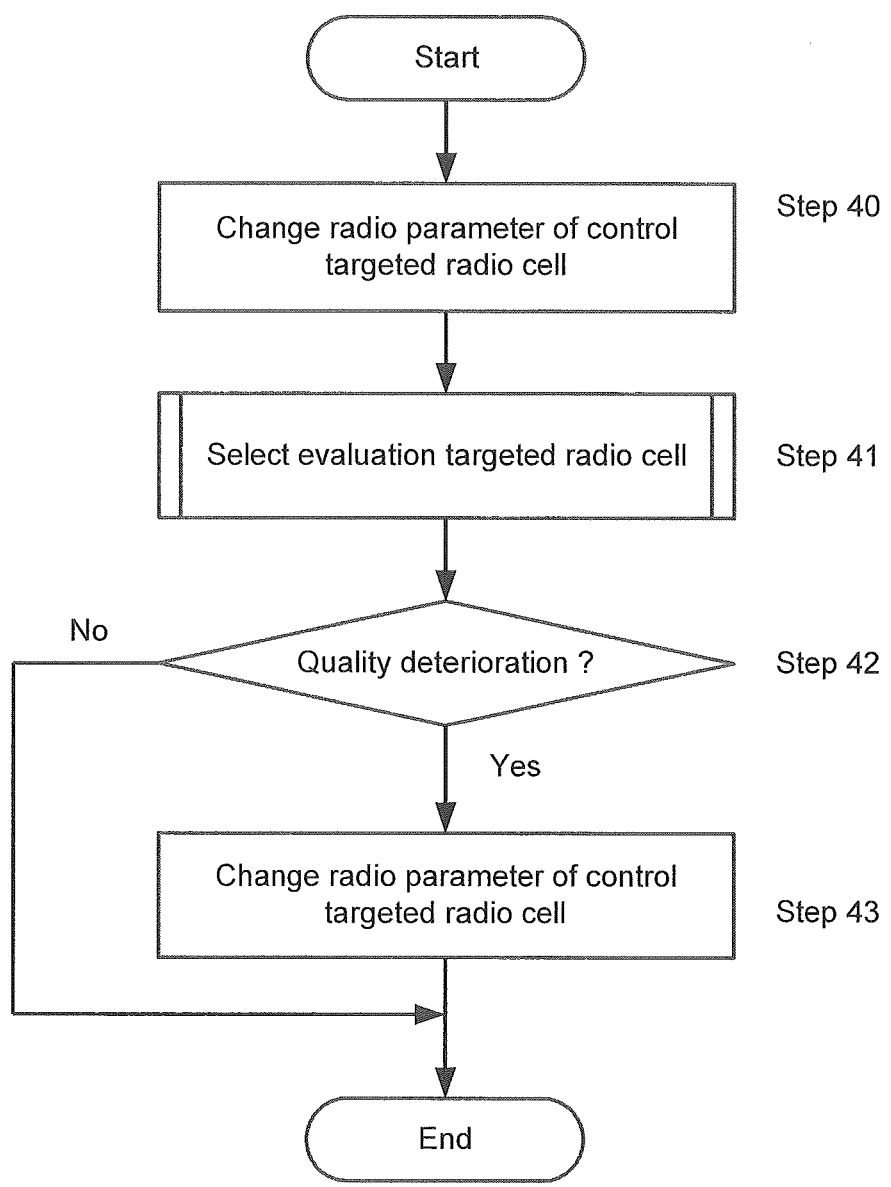
FIG. 12 is a flowchart of the overall operation in one example of the second embodiment.

FIG. 12 is a flowchart of the overall operation in one example of the second embodiment.

Firstly, the radio parameter control apparatus 30 collects measurement information (radio quality) measured by the UE 50, taking a control targeted radio cell as a serving cell or the surrounding radio cells of the control targeted radio cell as a serving cell, through the radio base station 40, and the radio parameter control unit 34 changes a radio parameter of the control targeted radio cell based on the collected radio quality information or performance counter information per radio cell (Step 40).

Next, the evaluation targeted radio cell selection unit 32 of the radio parameter control apparatus 30 selects an evaluation targeted radio cell for evaluating a radio parameter of the control targeted radio cell (Step 41). Note that the selection operation will be described later.

The quality evaluation unit 33 of the radio parameter control apparatus 30 evaluates quality of the evaluation targeted radio cell (Step 42). Then, when quality deterioration of the evaluation targeted radio cell is detected, the radio parameter control unit 34 of the radio parameter control apparatus 30 performs fallback of a radio parameter of the control targeted radio cell, or control for changing to a candidate value of a new radio parameter (Step 43).

Next, the operation for selecting an evaluation targeted radio cell for the control targeted radio cell will be described.

Figure 13:
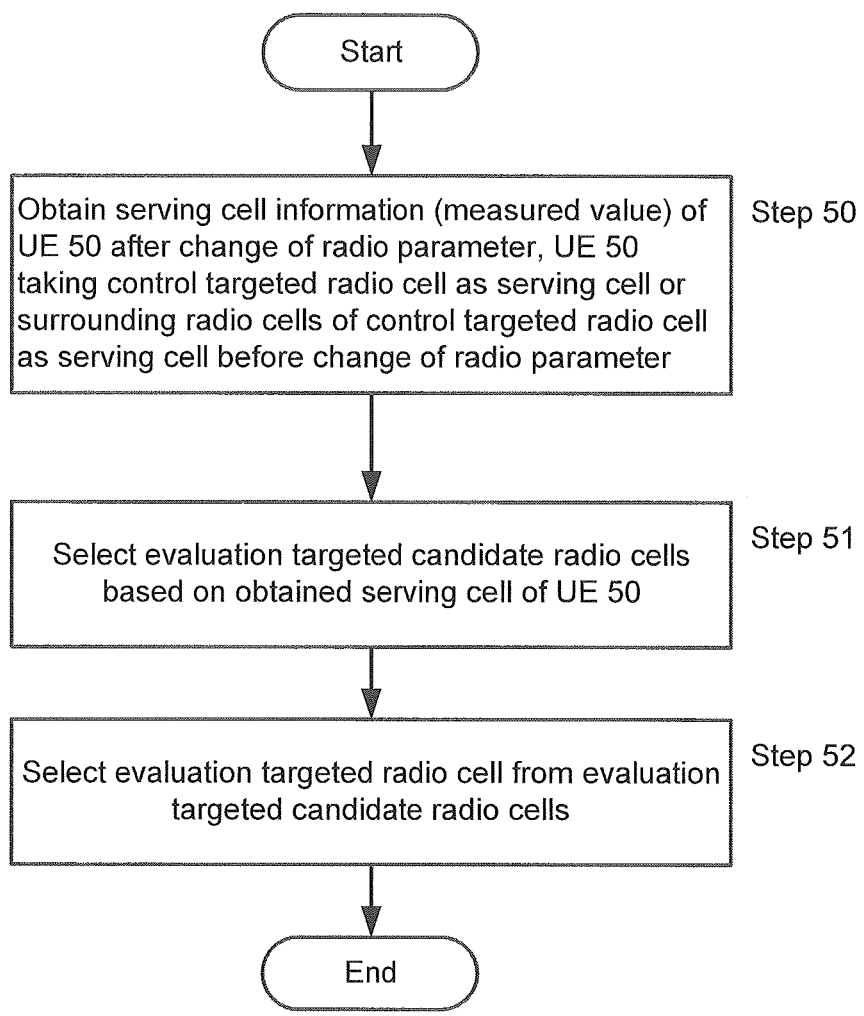
FIG. 13 is a flowchart of the evaluation targeted radio cell selection unit 32 in one example of the second embodiment.

FIG. 13 is a flowchart of the evaluation targeted radio cell selection unit 32 in one example of the second embodiment.

Firstly, the evaluation targeted radio cell selection unit 32 obtains serving cell information (measured value) of the UE 50 after a change of a radio parameter, the UE 50 having taken the control targeted radio cell as a serving cell or the surrounding radio cells of the control targeted radio cell as a serving cell before a change of the radio parameter (Step 50). Then, the evaluation targeted radio cell selection unit 32 selects the evaluation targeted candidate radio cells based on the obtained serving cell of the UE 50 (Step S51). Specifically, when a serving cell of one UE 50 is changed from the control targeted radio cell to other radio cells by a change of the radio parameter, the evaluation targeted radio cell selection unit 32 takes the obtained serving cell of the UE 50 after a change of the radio parameter as an evaluation targeted candidate radio cell. On the other hand, when a serving cell of one UE 50 is changed from the surrounding radio cells to the control targeted radio cell by a change of the radio parameter, the evaluation targeted radio cell selection unit 32 takes a serving cell before a change of the radio parameter of the UE 50 as an evaluation targeted candidate radio cell. Such operations are performed per UE 50.

Lastly, the evaluation targeted radio cell selection unit 32 selects an evaluation targeted radio cell from the evaluation targeted candidate radio cells (Step 52).

According to the second embodiment, since a radio terminal taking a control targeted radio cell as a serving cell before a change of a radio parameter obtains which radio terminal is taken as a serving cell after a change of the radio parameter, as a measured value, not as a predicted value, therefore, it is possible to select an evaluation targeted radio cell more accurately as compared with the first embodiment.

Third Embodiment

The third embodiment will be described.

In the above-described embodiments, the case in which the radio parameter control apparatus 30 includes the measurement information database 31, the evaluation targeted radio cell selection unit 32, the quality evaluation unit 33 and the radio parameter control unit 34 has been described.

Figure 14:
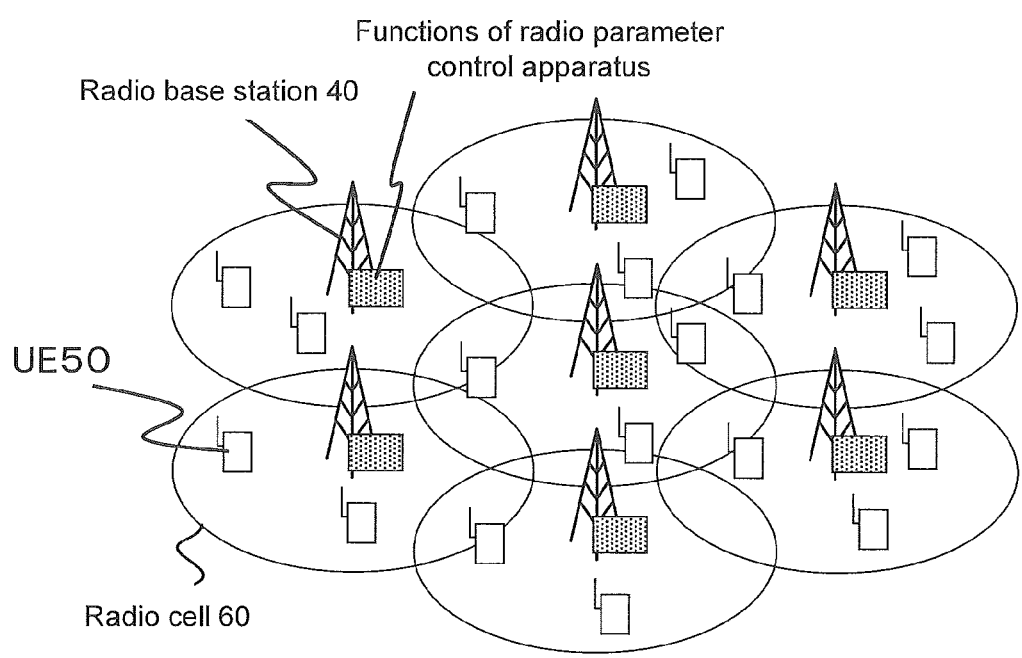
FIG. 14 is a configuration diagram of the radio communication system of a third embodiment.

However, the radio parameter control apparatus 30 does not necessarily include these elements. For example, as shown in FIG. 14, each radio base station 40 has functions of the radio parameter control apparatus 30, and when a plurality of the radio base stations 40 is directly connected with each other through a wired line or by radio, or indirectly connected with each other through a core network to be able to exchange some or all of quality information of radio cells or measurement information measured by the UE 50, it is possible to control a radio parameter in each radio base station 40.

Figure 15:
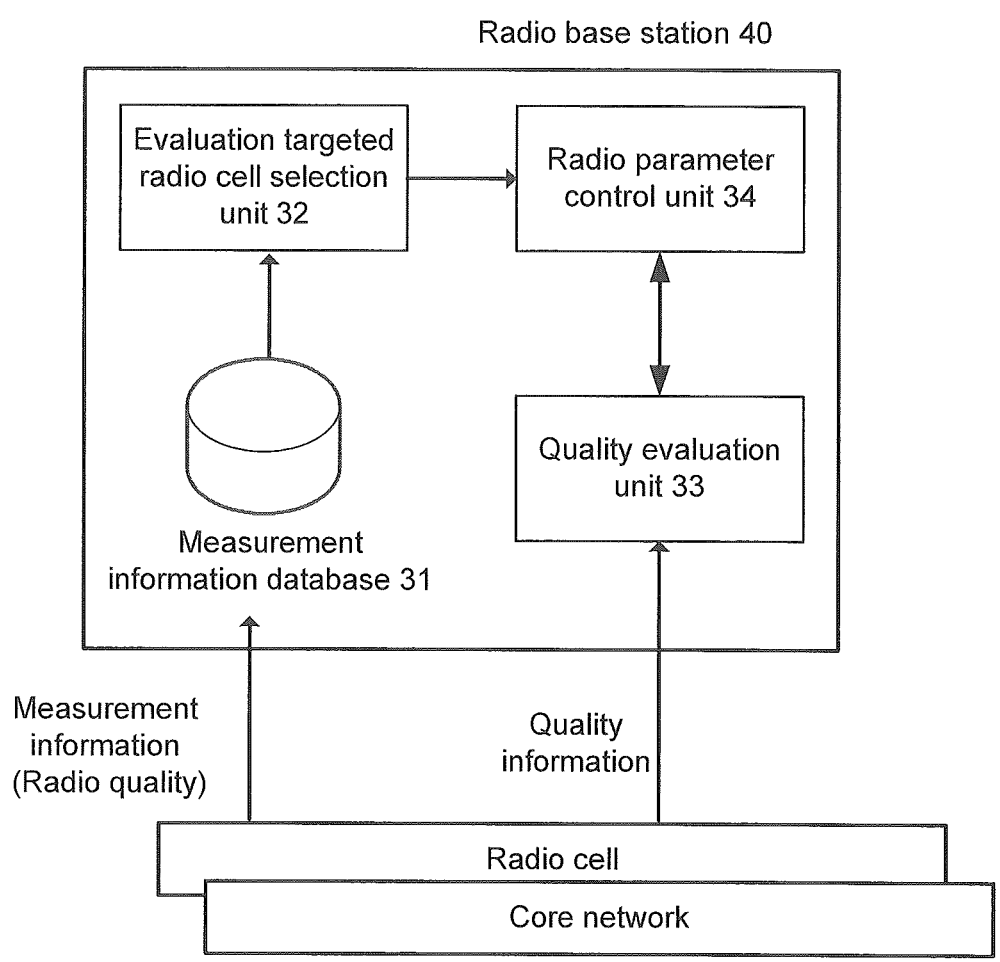
FIG. 15 is a block diagram of a radio base station of the third embodiment.

FIG. 15 shows a block diagram of the radio base station 40. The radio base station 40 includes the measurement information data base 31, the evaluation targeted radio cell selection unit 32, the quality evaluation unit 33 and the radio parameter control unit 34 in the same way as in the radio parameter control apparatus 30. It is the same as the embodiments described above except that the quality evaluation unit 33 obtains some or all of quality information of other radio cells from other radio cells directly or indirectly through au upper network to evaluate quality of other radio cells.

In the embodiments, each radio station autonomously obtains the evaluation targeted candidate radio cells to decide the evaluation targeted radio cell from the evaluation targeted candidate radio cells, and performs control of a radio parameter based on the results of quality evaluation of the evaluation targeted radio cell. Therefore, it is not necessary to install the apparatus for managing a plurality of radio base stations collectively. Further, it is suitable for rapid control of the radio parameter, because a series of the operations are performed within the radio base stations.

This is the end of the description of the embodiments and exemplary embodiments of the present invention, and as is apparent from the above-descriptions, each unit may be configured with hardware or may be realized by a computer program. In this case, the functions and operations similar to the embodiments and exemplary embodiments described above are realized by a processor under s program stored in a program memory. Only one part of the above-described functions of the embodiments or exemplary embodiment can be realized with the computer program.

The details of the above-described embodiments can be described as follows (Supplementary Note 1) A radio parameter control system for controlling a radio parameter of radio cells, the radio parameter control system comprising:

evaluation targeted radio cell selection means configured to decide evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and select at least one of the evaluation targeted candidate radio cells as an evaluation targeted radio cell for evaluating the radio parameter of the control targeted radio cell; and radio parameter control means configured to control the radio parameter of the control targeted radio cell based on quality of the evaluation targeted radio cell.

(Supplementary Note 2) The radio parameter control system according to supplementary note 1, wherein the evaluation targeted radio cell selection means takes at least one of radio cells excluding the control targeted radio cell as an evaluation targeted candidate radio cell, of the connection target radio cells of the radio terminal either before or after a change of a connection range of the control targeted radio cell, the radio terminal taking the control targeted radio cell as a connection target radio cell either before or after a change of a connection range of the control targeted radio cell.

(Supplementary Note 3) The radio parameter control system according to supplementary note 1 or 2, wherein the evaluation targeted radio cell selection means predicts a connection target radio cell of the radio terminal assuming that changing the radio parameter to a candidate value, and decides the evaluation targeted candidate radio cell based on a change between the predicted connection target radio cell of the radio terminal and the connection target radio cell of the radio terminal in a current setting value of the radio parameter.

(Supplementary Note 4) The radio parameter control system supplementary note to claim 3, wherein the evaluation targeted radio cell selection means predicts a connection target radio cell of the radio terminal taking the control targeted radio cell as a serving cell assuming that changing the radio parameter to the candidate value, and takes the predicted connection target radio cell as the evaluation targeted candidate radio cell.

(Supplementary Note 5) The radio parameter control system according to supplementary note 3, wherein the evaluation targeted radio cell selection means predicts a connection target radio cell of the radio terminal taking the surrounding radio cells of the control targeted radio cell as a serving cell assuming that changing the radio parameter to the candidate value, and takes the surrounding radio cells as the evaluation targeted candidate radio cells when the connection target radio cell is the control targeted radio cell.

(Supplementary Note 6) The radio parameter control system according to any of supplementary notes 3 to 5, wherein the evaluation targeted radio cell selection means predicts a connection target radio cell of the radio terminal based on measurement information collected from the radio terminal.

(Supplementary Note 7) The radio parameter control system according to any of supplementary notes 3 to 6, wherein the evaluation targeted radio cell selection means predicts radio quality of the radio terminal when it is assumed that changing the radio parameter to the candidate value, using the measurement information, which is collected from the radio terminal, including radio quality of the control targeted radio cell and of the radio cells excluding the control targeted radio cell, and predicts a top predetermined number of the radio cells with the predicted high radio quality as the connection target radio cell.

(Supplementary Note 8) The radio parameter control system according to supplementary note 7, wherein the radio quality includes at least any of received power, received quality, a signal to interference plus noise power ratio and throughput.

(Supplementary Note 9) The radio parameter control system according to any of supplementary notes 3 to 8, wherein when there is a plurality of candidate values of the radio parameter, the evaluation targeted radio cell selection means selects a radio cell that is predicted to become the evaluation targeted candidate radio cell in at least one of the candidate values, as the evaluation targeted candidate radio cell.

(Supplementary Note 10) The radio parameter control system according to any of supplementary notes 3 to 9, wherein the evaluation targeted radio cell selection means selects a radio cell that is predicted to become the evaluation targeted candidate radio cell as the evaluation targeted candidate radio cell, in at least one or more than one radio parameter of a plurality of radio parameters.

(Supplementary Note 11) The radio parameter control system according to supplementary note 1 or 2, wherein the evaluation targeted radio cell selection means obtains serving cell information before or after a change of the radio parameter, and decides the evaluation targeted candidate radio cell based on a change of the serving cell before or after a change of the radio parameter.

(Supplementary Note 12) The radio parameter control system according to supplementary note 11, wherein the evaluation targeted radio cell selection means obtains serving cell information after a change of radio parameter, of the radio terminal having taken the control targeted radio cell as a serving cell before a change of the radio parameter, and takes a serving cell of the radio terminal after a change of the radio parameter as the evaluation targeted candidate radio cell.

(Supplementary Note 13) The radio parameter control system according to supplementary note 11, wherein the evaluation targeted radio cell selection means obtains serving cell information before a change of radio parameter, of the radio terminal taking the control targeted radio cell as a serving cell after a change of the radio parameter, and takes a serving cell of the radio terminal before a change of the radio parameter as the evaluation targeted candidate radio cell.

(Supplementary Note 14) The radio parameter control system according to any of supplementary notes 11 to 13, wherein the evaluation targeted radio cell selection means obtains serving cell information either before or after a change of the radio parameter, using either a trace function for the radio terminal, or a serving cell reported from the radio terminal, or handover information.

(Supplementary Note 15) The radio parameter control system according to any of supplementary notes 1 to 14, wherein the evaluation targeted radio cell selection means obtains importance degree of the evaluation targeted candidate radio cells, and selects the evaluation targeted candidate radio cell with the high importance degree as the evaluation targeted radio cell.

(Supplementary Note 16) The radio parameter control system according to supplementary note 15, wherein the evaluation targeted radio cell selection means obtains importance degree of the evaluation targeted candidate radio cells such that the evaluation targeted candidate radio cell having a high number of radio terminals of which a destination is changed with the control targeted radio cell is provided with a relatively high importance degree.

(Supplementary Note 17) The radio parameter control system according to supplementary note 15, wherein the evaluation targeted radio cell selection means obtains importance degree of the evaluation targeted candidate radio cells such that the evaluation targeted candidate radio cell having a high change rate in the number of radio terminals by a change of the radio parameter is provided with a relatively high importance degree.

(Supplementary Note 18) The radio parameter control system according to supplementary note 15, wherein the evaluation targeted radio cell selection means obtains importance degree of the evaluation targeted candidate radio cells such that the evaluation targeted candidate radio cell having a high number of handovers performed with the control targeted radio cell is provided with a relatively high importance degree.

(Supplementary Note 19) The radio parameter control system according to any of supplementary notes 1 to 18, wherein the evaluation targeted radio cell selection means takes the evaluation targeted candidate radio cells as temporary control targeted radio cells, and decides a second evaluation targeted candidate radio cell based on a change of a connection target radio cell of a radio terminal associated with a change of a connection range of the temporary control targeted radio cells by control of the radio parameter of the temporary control targeted radio cells to include the second evaluation targeted candidate radio cell in the evaluation targeted candidate radio cells.

(Supplementary Note 20) The radio parameter control system according to supplementary note 19, wherein the evaluation targeted radio cell selection means selects the evaluation targeted candidate radio cell with the high importance degree as the temporary control targeted radio cell.

(Supplementary Note 21) The radio parameter control system according to any of supplementary notes 1 to 20, wherein the radio parameter control means evaluates quality of the evaluation targeted radio cell with emphasis, as compared with quality of radio cells other than the evaluation targeted radio cell.

(Supplementary Note 22) The radio parameter control system according to any of supplementary notes 15 to 21, wherein the radio parameter control means evaluates quality of radio cells with high importance degree of the evaluation targeted candidate radio cells with emphasis, of the evaluation targeted radio cells.

(Supplementary Note 23) The radio parameter control system according to any of supplementary notes 1 to 22, wherein quality of the evaluation targeted radio cells is at least any of traffic burden, average throughput, an abnormal cut-off rate and a failure rate of handover.

(Supplementary Note 24) The radio parameter control system according to any of supplementary notes 1 to 23, wherein the radio parameter control means performs fallback of the radio parameter based on quality of the evaluation results of the evaluation targeted radio cell.

(Supplementary Note 25) The radio parameter control system according to any of supplementary notes 1 to 23, wherein the radio parameter control means changes the radio parameter based on quality of the evaluation results of the evaluation targeted radio cell.

(Supplementary Note 26) The radio parameter control system according to any of supplementary notes 1 to 25, wherein the evaluation targeted radio cell selection means and the radio parameter control means are provided with a radio parameter control apparatus connected to a radio base station.

(Supplementary Note 27) The radio parameter control system according to any of supplementary notes 1 to 25, wherein the evaluation targeted radio cell selection means and the radio parameter control means are provided with the radio base station.

(Supplementary Note 28) The radio parameter control system according to any of supplementary notes 1 to 25, wherein the evaluation targeted radio cell selection means is provided with the radio base station, and the radio parameter control means is provided with the radio parameter control apparatus connected to the radio base station.

(Supplementary Note 29) A radio parameter control apparatus for controlling a radio parameter of radio cells, the radio parameter control apparatus comprising:

evaluation targeted radio cell selection means configured to decide evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and select at least one of the evaluation targeted candidate radio cells as an evaluation targeted radio cell for evaluating the radio parameter of the control targeted radio cell; and radio parameter control means configured to control the radio parameter of the control targeted radio cell based on quality of the evaluation targeted radio cell.

(Supplementary Note 30) The radio parameter control apparatus according to supplementary note 29, wherein the evaluation targeted radio cell selection means takes at least one of radio cells excluding the control targeted radio cell as an evaluation targeted candidate radio cell, of the connection target radio cells of the radio terminal either before or after a change of a connection range of the control targeted radio cell, the radio terminal taking the control targeted radio cell as a connection target radio cell either before or after a change of a connection range of the control targeted radio cell.

(Supplementary Note 31) The radio parameter control apparatus according to supplementary note 29 or 30, wherein the evaluation targeted radio cell selection means predicts a connection target radio cell of the radio terminal assuming that changing the radio parameter to a candidate value, and decides the evaluation targeted candidate radio cell based on a change between the predicted connection target radio cell of the radio terminal and the connection target radio cell of the radio terminal in a current setting value of the radio parameter.

(Supplementary Note 32) The radio parameter control apparatus according to supplementary note 31, wherein the evaluation targeted radio cell selection means predicts a connection target radio cell of the radio terminal taking the control targeted radio cell as a serving cell assuming that changing the radio parameter to the candidate value, and takes the predicted connection target radio cell as the evaluation targeted candidate radio cell.

(Supplementary Note 33) The radio parameter control apparatus according to supplementary note 31, wherein the evaluation targeted radio cell selection means predicts a connection target radio cell of the radio terminal taking the surrounding radio cells of the control targeted radio cell as a serving cell assuming that changing the radio parameter to the candidate value, and takes the surrounding radio cells as the evaluation targeted candidate radio cells when the connection target radio cell is the control targeted radio cell.

(Supplementary Note 34) The radio parameter control apparatus according to any of supplementary notes 31 to 33, wherein the evaluation targeted radio cell selection means predicts a connection target radio cell of the radio terminal based on measurement information collected from the radio terminal.

(Supplementary Note 35) The radio parameter control apparatus according to supplementary note 29 or 30, wherein the evaluation targeted radio cell selection means obtains serving cell information before or after a change of the radio parameter, and takes a serving cell of the radio terminal after a change of the radio parameter as a connection target radio cell of the radio terminal, the serving cell that decides the evaluation targeted candidate radio cell based on a change of the serving cell before or after a change of the radio parameter.

(Supplementary Note 36) The radio parameter control apparatus according to supplementary note 35, wherein the evaluation targeted radio cell selection means obtains serving cell information after a change of radio parameter, of the radio terminal having taken the control targeted radio cell as a serving cell before a change of the radio parameter, and takes a serving cell of the radio terminal after a change of the radio parameter as the evaluation targeted candidate radio cell.

(Supplementary Note 37) The radio parameter control apparatus according to supplementary note 35, wherein the evaluation targeted radio cell selection means obtains serving cell information before a change of radio parameter, of the radio terminal taking the control targeted radio cell as a serving cell after a change of the radio parameter, and takes a serving cell of the radio terminal before a change of the radio parameter as the evaluation targeted candidate radio cell.

(Supplementary Note 38) The radio parameter control apparatus according to any of supplementary notes 35 to 37, wherein the evaluation targeted radio cell selection means obtains serving cell information either before or after a change of the radio parameter, using either a trace function for the radio terminal, or a serving cell reported from the radio terminal, or handover information.

(Supplementary Note 39) A radio base station for controlling a radio parameter of radio cells, the radio base station comprising:

evaluation targeted radio cell selection means configured to decide evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and select at least one of the evaluation targeted candidate radio cells as an evaluation targeted radio cell for evaluating the radio parameter of the control targeted radio cell; and radio parameter control means configured to control the radio parameter of the control targeted radio cell based on quality of the evaluation targeted radio cell.

(Supplementary Note 40) A radio parameter control method for controlling a radio parameter of radio cells, the method comprising:

deciding evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and selecting at least one of the evaluation targeted candidate radio cells as an evaluation targeted radio cell for evaluating the radio parameter of the control targeted radio cell; and controlling the radio parameter of the control targeted radio cell based on quality of the evaluation targeted radio cell.

(Supplementary Note 41) A program for controlling a radio parameter of radio cells, the program causes a computer to execute:

deciding evaluation targeted candidate radio cells based on a change of a connection target radio cell of a radio terminal, which takes a control targeted radio cell as a serving cell or surrounding radio cells of the control targeted radio cell as a serving cell, associated with a change of a connection range of the control targeted radio cell by control of the radio parameter of the control targeted radio cell, and selecting at least one of the evaluation targeted candidate radio cells as an evaluation targeted radio cell for evaluating the radio parameter of the control targeted radio cell; and controlling the radio parameter of the control targeted radio cell based on quality of the evaluation targeted radio cell.

Above, while the present invention has been particularly shown and described with reference to embodiments, the present invention is not limited to the above mentioned embodiments. It will be understood by those of ordinary skill in the art that various changes in form and details may be made therein without departing from the spirit and scope of the present invention. In addition, an appropriate combination of the embodiments may be employed.

This application is based upon and claims the benefit of priority from Japanese patent application No. 2011-271828, filed on Dec. 13, 2011, the disclosure of which is incorporated herein in its entirety by reference.

REFERENCE SIGNS LIST 1a to 1d Radio terminals
2 Control targeted radio cell
3a to 3c Radio cells
10 Radio terminal
11 Evaluation targeted radio cell selection unit
12 Radio parameter control unit
13 Radio communication network
30 Radio parameter control apparatus
31 Measurement information database
32 Evaluation targeted radio cell selection unit
33 Quality evaluation unit
34 Radio parameter control unit
40 Radio base station
50 UE
60 Radio cell

The invention claimed is:

1. A radio parameter control system for controlling a radio parameter that controls the coverage of radio cells, the radio parameter control system comprising a radio parameter control apparatus and radio terminals, wherein the radio parameter control apparatus comprises:
at least one processor;
a memory coupled to the at least one processor;
wherein the at least one processor is configured to implement;
an evaluation-targeted-radio-cell-selector configured to:

predict connection-targeted-radio-cells of radio terminals that are connected to a control-targeted-radio-cell as a serving cell, under an assumption that the radio parameter is changed to a candidate value,
evaluation-targeted-candidate-radio-cells from the predicted connection-targeted-radio-cells, and
an evaluation-targeted-radio-cell from the decided evaluation-targeted-candidate-radio-cells, for evaluating an influence of the radio parameter of the control-targeted-radio-cell on the decided evaluation-targeted-radio-cell; and a radio parameter controller configured to control the radio parameter of the control-targeted-radio-cell based on radio quality of the decided evaluation-targeted-radio-cell or radio communication quality by the decided evaluation-targeted-radio-cell.

2. A radio parameter control apparatus for controlling a radio parameter that controls the coverage of radio cells, the radio parameter control apparatus comprising:
at least one processor;
a memory coupled to the at least one processor;
wherein the at least one processor is configured to implement;
an evaluation-targeted-radio-cell-selector configured to:

predict connection-targeted-radio-cells of radio terminals that are connected to a control-targeted-radio-cell as a serving cell, under an assumption that the radio parameter is changed to a candidate value,
evaluation-targeted-candidate-radio-cells from the predicted connection-targeted-radio-cells, and
an evaluation-targeted-radio-cell from the decided evaluation-targeted-candidate-radio-cells, for evaluating an influence of the radio parameter of the control-targeted-radio-cell on the decided evaluation-targeted-radio-cell; and radio parameter controller configured to control the radio parameter of the control-targeted-radio-cell based on radio quality of the decided evaluation-targeted-radio-cell or radio communication quality by the decided evaluation-targeted-radio-cell.

3. The radio parameter control apparatus according to claim 2,
wherein the evaluation-targeted-radio-cell-selector takes at least one of radio cells excluding the control-targeted-radio-cell as an evaluation-targeted-candidate-radio-cell, of the connection target radio cells of the radio terminal either before or after a change of a connection range of the control-targeted-radio-cell, the radio terminal taking the control-targeted-radio-cell as a connection target radio cell either before or after a change of a connection range of the control-targeted-radio-cell.

4. The radio parameter control apparatus according to claim 2,
wherein the evaluation-targeted-radio-cell-selector predicts a connection target radio cell of the radio terminal based on measurement information collected from the radio terminal.

5. The radio parameter control apparatus according to claim 2,
wherein the evaluation-targeted-radio-cell-selector obtains serving cell information before or after a change of the radio parameter, and decides the evaluation-targeted-candidate-radio-cell based on a change of the serving cell before or after a change of the radio parameter.

6. The radio parameter control apparatus according to claim 5,
wherein the evaluation-targeted-radio-cell-selector obtains serving cell information after a change of the radio parameter, of the radio terminal having taken the control-targeted-radio-cell as a serving cell before the change of the radio parameter, and takes the serving cell of the radio terminal after the change of the radio parameter as the evaluation-targeted-candidate-radio-cell.

7. The radio parameter control apparatus according to claim 5, wherein the evaluation-targeted-radio-cell-selector obtains serving cell information before a change of the radio parameter, of the radio terminal taking the control-targeted-radio-cell as a serving cell after the change of the radio parameter, and takes the serving cell of the radio terminal before the change of the radio parameter as the evaluation-targeted-candidate-radio-cell.

8. The radio parameter control apparatus according to claim 5,
wherein the evaluation-targeted-radio-cell-selector obtains serving cell information either before or after a change of the radio parameter, using either a trace function for the radio terminal, or a serving cell reported from the radio terminal, or handover information.

9. A radio base station for controlling a radio parameter that controls the coverage of radio cells, the radio base station comprising:
at least one processor;
a memory coupled to the at least one processor;
wherein the at least one processor is configured to implement;
an evaluation-targeted-radio-cell-selector configured to
predict connection-targeted-radio-cells of radio terminals taking a control-targeted-radio-cell as a serving cell, under an assumption that the radio parameter is changed to a candidate value,
connection-targeted-radio-cells as an evaluation-targeted-candidate-radio-cells, and,
evaluation-targeted-radio-cell from the decided evaluation-targeted-candidate-radio-cells, for evaluating an influence of the radio parameter of the control-targeted-radio-cell on the decide evaluation-targeted-radio-cell; and
radio parameter controller configured to control the radio parameter of the control-targeted-radio-cell based on radio quality of the decided evaluation-targeted-radio-cell or radio communication quality by the decided evaluation-targeted-radio-cell.

10. A radio parameter control method for controlling a radio parameter that controls the coverage of radio cells using a radio parameter control apparatus, the method comprising:
connection-targeted-radio-cells of radio terminals taking a control-targeted-radio-cell as a serving cell, under an assumption that the radio parameter is changed to a candidate value,
connection-targeted-radio-cells as an evaluation-targeted-candidate-radio-cells,
an evaluation-targeted-radio-cell from the decided evaluation-targeted-candidate-radio-cells, for evaluating the influence of the radio parameter of the control-targeted-radio-cell on the decided evaluation-targeted-radio-cell; and
controlling the radio parameter of the control-targeted-radio-cell based on radio quality of the decided evaluation-targeted-radio-cell or radio communication quality by the decided evaluation-targeted-radio-cell.

11. The radio parameter control system according to claim 2, wherein the radio parameter controller is configured to control the radio parameter of the control-targeted-radio-cell based on radio quality of the decided evaluation-targeted-radio-cell.

12. The radio parameter control system according to claim 2, wherein the radio parameter controller is configured to control the radio parameter of the control-targeted-radio-cell based on radio communication quality by the evaluation-targeted-radio-cell.

13. The radio parameter control system according to claim 2, wherein the radio parameter controller is configured to control the radio parameter of the control-targeted-radio-cell based on radio quality of the decided evaluation-targeted-radio-cell and radio communication quality by the evaluation-targeted-radio-cell.

14. A radio parameter control system for controlling a radio parameter that controls the coverage of radio cells, the radio parameter control system comprising a radio parameter control apparatus and radio terminals,
wherein the radio parameter control apparatus comprises:
at least one processor;
a memory coupled to the at least one processor;
wherein the at least one processor is configured to implement;
an evaluation-targeted-radio-cell-selector configured to:
predict a connection-targeted-radio-cell of radio terminals that are connected to surrounding radio cells of the control-targeted-radio-cell as serving cells, under an assumption that the radio parameter is changed to a candidate value,
decide evaluation-targeted-candidate-radio-cells from the surrounding radio cells when the predicted connection target radio cell is the control-targeted-radio-cell, and
decide an evaluation-targeted-radio-cell from the decided evaluation-targeted-candidate-radio-cells, for evaluating an influence of the radio parameter of the control-targeted-radio-cell on the decided evaluation-targeted-radio-cell; and
a radio parameter controller configured to control the radio parameter of the control-targeted-radio-cell based on radio quality of the decided evaluation-targeted-radio-cell or radio communication by the decided evaluation-targeted-radio-cell.

15. A radio parameter control apparatus for controlling a radio parameter that controls the coverage of radio cells, the radio parameter control apparatus comprising:
at least one processor;
a memory coupled to the at least one processor;
wherein the at least one processor is configured to implement;
an evaluation-targeted-radio-cell-selector configured to:
predict a connection-targeted-radio-cell of radio terminals that are connected to surrounding radio cells of the control-targeted-radio-cell as serving cells, under an assumption that the radio parameter is changed to a candidate value, decide evaluation-targeted-candidate-radio-cells from the surrounding radio cells when the predicted connection target radio cell is the control-targeted-radio-cell, and decide an evaluation-targeted-radio-cell from the decided evaluation-targeted-candidate-radio-cells, for evaluating an influence of the radio parameter of the control-targeted-radio-cell on the decided evaluation-targeted-radio-cell; and a radio parameter controller configured to control the radio parameter of the control-targeted-radio-cell based on radio quality of the decided evaluation-targeted-radio-cell or radio communication by the decided evaluation-targeted-radio-cell.

16. A radio base station for controlling a radio parameter that controls the coverage of radio cells, the radio base station comprising:

at least one processor;

a memory coupled to the at least one processor;

wherein the at least one processor is configured to implement;

an evaluation-targeted-radio-cell-selector configured to
predict connection-targeted-radio-cells of radio terminals of which surrounding radio cells of the control-targeted-radio-cell are serving cells, under an assumption that the radio parameter is changed to a candidate value, decide the surrounding radio cells when the predicted connection target radio cell is the control-targeted-radio-cell, as the evaluation-targeted-candidate-radio-cells, and decide an evaluation-targeted-radio-cell from the decided evaluation-targeted-candidate-radio-cells, for evaluating an influence of the radio parameter of the control-targeted-radio-cell on the decide evaluation-targeted-radio-cell; and a radio parameter controller configured to control the radio parameter of the control-targeted-radio-cell based on radio quality of the decided evaluation-targeted-radio-cell or radio communication quality by the decided evaluation-targeted-radio-cell.

17. A radio parameter control method for controlling a radio parameter that controls the coverage of radio cells using a radio parameter control apparatus, the method comprising:

predicting connection-targeted-radio-cells of radio terminals of which surrounding radio cells of the control-targeted-radio-cell are serving cells, under an assumption that the radio parameter is changed to a candidate value, deciding the surrounding radio cells when the predicted connection target radio cell is the control-targeted-radio-cell, as the evaluation-targeted-candidate-radio-cells, deciding an evaluation-targeted-radio-cell from the decided evaluation-targeted-candidate-radio-cells, for evaluating the influence of the radio parameter of the control-targeted-radio-cell on the decided evaluation-targeted-radio-cell; and controlling the radio parameter of the control-targeted-radio-cell based on radio quality of the decided evaluation-targeted-radio-cell or radio communication quality by the decided evaluation-targeted-radio-cell.

* * * * *